(12) United States Patent
Vrba et al.

(10) Patent No.: US 8,145,333 B2
(45) Date of Patent: Mar. 27, 2012

(54) ONTOLOGY-BASED SYSTEM AND METHOD FOR INDUSTRIAL CONTROL

(75) Inventors: Pavel Vrba, Vejprnice (CZ); Kenwood H. Hall, Hudson, OH (US); Petr Kadera, Prague (CZ); Vladimir Marik, Prague (CZ); Marek Obitko, Kladno (CZ); Miloslav Radakovic, Ruzomberok (SK)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 395 days.

(21) Appl. No.: 12/325,893

(22) Filed: Dec. 1, 2008

(65) Prior Publication Data

US 2010/0138017 A1 Jun. 3, 2010

(51) Int. Cl.
*G06F 19/00* (2011.01)
(52) U.S. Cl. .......................................... 700/100; 700/99
(58) Field of Classification Search ................ 700/99, 700/100; 705/8
See application file for complete search history.

(56) References Cited

U.S. PATENT DOCUMENTS

| | | | |
|---|---|---|---|
| 6,091,998 A | 7/2000 | Vakso | |
| 6,400,999 B1 * | 6/2002 | Kashiyama et al. | 700/100 |
| 6,430,454 B1 | 8/2002 | Vakso | |
| 6,671,569 B1 * | 12/2003 | Schoop et al. | 700/112 |
| 7,146,232 B2 | 12/2006 | Staron | |
| 7,203,575 B2 | 4/2007 | Maturana | |
| 7,228,187 B2 | 6/2007 | Tichy | |
| 7,305,272 B2 | 12/2007 | Maturana | |
| 7,363,204 B2 | 4/2008 | Colombo | |
| 7,848,836 B2 * | 12/2010 | Gozzi et al. | 700/100 |
| 2007/0294298 A1 | 12/2007 | Lemcke et al. | |

OTHER PUBLICATIONS

Denkena, B., Shpitalni, M., Kowalski, P., Molcho, G., and Zipori, Y. "Knowledge Management in Process Planning". Annals of the CIRP vol. 56 (Jan. 2007): 175-180.*
Candido, G. and Barata, J., "A Multiagent Control System for Shop Floor Assembly," in: HoloMAS 2007, LNAI 4659, pp. 293-302.
Al-Safi, Y. and Vyatkin, V., "An Ontology-Based Reconfiguration Agent for Intelligent Mechatronic Systems," in: HoloMAS 2007, LNAI 4659, pp. 114-126.
Orozco, O.J.L. and Lastra, J.L.M., "Using Semantic Web Technologies to Describe Automation Objects," Int. J. Manufacturing Research, 2006, vol. 1, No. (4): pp. 482-503.
ANSI/ISA-88.01—1995 Batch Control Part 1: Models and Terminology.

(Continued)

*Primary Examiner* — Ryan Jarrett
(74) *Attorney, Agent, or Firm* — Whyte Hirschboeck Dudek S.C.; William R. Walbrun

(57) ABSTRACT

An industrial control system and method of controlling an industrial process are disclosed herein. In at least one embodiment, the control system includes an order system configured to receive an order from an external source and process the order to generate an order instance in accordance with an order ontology, at least one database storing a plurality of selectable generalized production plans and information identifying capabilities of a plurality of control entities, and a product agent in at least indirect communication with the order system, the at least one database and the control entities. The product agent receives at least one portion of the order instance, selects at least one of the generalized production plans, and communicates with the control entities so as to determine a production plan instance suitable for governing at least one aspect of an industrial process in order to satisfy at least one portion of the received order corresponding to the at least one portion of the order instance.

28 Claims, 6 Drawing Sheets

OTHER PUBLICATIONS

Obitko, M., Vrba, P., Marik, V., Radakovic, M.: Semantics in Industrial Distributed Systems, IFAC 17th World Congress, 2008, pp. 13880-13887.

Lemaignan, S., Siadata, A., Dantan, J-Y., and Semenenko, A.: "Mason: A Proposal for an Ontology of Manufacturnig Domain," 2006, in: IEEE Workshop on Distributed Intelligent Systems (DIS), pp. 195-200.

Vyatkin, V., Christensen, J.H., Lastra, J.L.M.,: OOONEIDA: An Open, Object-Oriented Knowledge Economy for Intelligent Industrial Automation, IEEE Transactions on Industrial Informatics, vol. I, No. 1: pp. 4-17, 2005.

* cited by examiner

200
ONTOLOGY-BASED SYSTEM AND METHOD FOR INDUSTRIAL CONTROL

FIELD OF THE INVENTION

The present invention relates to industrial control systems and, more particularly, to distributed industrial control systems employing a plurality of agents for controlling and/or monitoring a process.

BACKGROUND OF THE INVENTION

A variety of industrial controllers (or industrial computers) are available for performing a wide variety of commercial and industrial processes including, for example, programmable logic controllers (PLCs). Generally, an industrial controller is a specialized computer having input/output (I/O) circuitry by which the controller is in communication with sensors and actuators on the machines of the industrial process. The industrial controller executes a control program to read inputs from sensors on the machines implementing the process, and based on the values of those inputs and control logic of the control program, produces outputs to actuators to control the process. Industrial controllers are frequently modular in construction, so that the number of input and output circuits and the processor power can be tailored to the demands of the particular process.

Industrial controllers can be implemented using centralized or distributed schemes. In many traditional centralized approaches, a single controller is employed for a variety of purposes, including production control, planning and scheduling and supply chain management. However, the use of such centralized control schemes has become more difficult and inefficient with respect to controlling many modern industrial systems and processes. Many modern industrial systems and processes not only involve high levels of complexity but also need to be highly flexible and dynamically reconfigurable in terms of their organization and manners of operation. Yet it is often difficult to program a single centralized controller so as to achieve effective control over such complex systems and to allow for such flexibility and dynamic reconfigurability of operation by such complex systems.

While centralized control schemes face these limitations, over the past several years it has been recognized that distributed systems technologies, such as service oriented architectures (SOA) or multi-agent systems (MAS), offer powerful methods and techniques for implementing a new generation of flexible and reconfigurable industrial control solutions. In general, such distributed systems employ multiple independent or semi-independent intelligent decision making components (e.g., "intelligent agents," simply "agents" or sometimes simply "services") that are each capable of knowledge gathering, reasoning, information exchange, and cooperation with one another based on service matchmaking and negotiation. By way of information and knowledge sharing that occurs among these components, cooperation and coordination among the components can be achieved. At the same time, because the control responsibilities are spread among, and can be shifted among, the different control components, greater flexibility and dynamic reconfigurability is afforded.

Despite the aforementioned advantages of such distributed control systems, it should be recognized that the control components of those systems are still tightly coupled (rather than loosely coupled) with one another in terms of the automated gathering and integration of data, information and knowledge. In particular, specific groups of control components are often configured (or even dedicated) for handling particular tasks associated with different portions or levels of an industrial process. For example, a given group of control components may deal exclusively with the manufacture of a given portion of an overall product being manufactured, deal exclusively with transportation of materials/components between different portions of an assembly line, or deal exclusively with the overall "enterprise management" of a factory while not dealing with more specialized aspects of factory operation.

While the control components within a particular group may have well-developed communication protocols or formats by which the control components of that group can communicate with one another, communications among different groups often is more limited, is far from being open and, indeed, can require human intervention to take place. This is the case because, among other reasons, the distributed systems tend to be programmed with a focus on performing particular tasks rather than on interoperability. Notwithstanding these limitations associated with conventional distributed control systems, there remains a desire to achieve better integration of different portions or operational segments of industrial systems, including different levels of components associated with industrial systems (e.g., those associated with the shop floor level up to those associated with enterprise management).

Accordingly, it would be advantageous if an open system that enabled and facilitated communication and cooperation among distributed control components and groups of such components at a larger scale with less (or without any) human intervention could be developed.

BRIEF SUMMARY OF THE INVENTION

In at least one embodiment, the present invention relates to a method of controlling an industrial process. The method includes receiving an order, and processing the order so as to generate an order instance representative of the received order in accordance with an order ontology. The method also includes generating a production plan instance in accordance with a production plan ontology, the production plan instance being developed at least in part by a first agent in response to receiving at least one portion of the order instance, the production plan instance being representative of a plan for operating the industrial process in a manner so as to satisfy at least one portion of the received order. The method further includes controlling the industrial process based at least indirectly upon the production plan instance.

Additionally, in at least one embodiment, the present invention relates to a method of controlling an industrial process so as to produce a product in response to an order. The method includes receiving the order from an external source, and processing the order at an order system so as to generate an order instance representative of the received order in accordance with an order ontology. The method also includes identifying a plurality of product order instances based upon the order instance, and sending the plurality of product order instances respectively to a plurality of product agents, respectively. Further, the method includes conducting communications between the plurality of product agents and at least one database so as to identify a plurality of generalized production plans capable of serving as bases for developing a plurality of production plan instances for at least indirectly governing a plurality of aspects of the industrial process in a manner so as to satisfy respective product orders associated with the plurality of product order instances, respectively. Also, the method includes conducting additional communications between the plurality of product agents and a plurality of additional agents, wherein the plurality of product agents based upon the additional communications and the plurality of generalized production plans develop the plurality of production plan instances. Additionally, the method includes controlling the aspects of the industrial process based at least indirectly upon the production plan instances.

Further, in at least one embodiment, the present invention relates to an industrial control system. The industrial control system includes an order system configured to receive an order from an external source and process the order to generate an order instance in accordance with an order ontology, at least one database storing a plurality of selectable generalized production plans and information identifying capabilities of a plurality of control entities, and a product agent in at least indirect communication with the order system, the at least one database and the control entities. The product agent receives at least one portion of the order instance, selects at least one of the generalized production plans, and communicates with the control entities so as to determine a production plan instance suitable for governing at least one aspect of an industrial process in order to satisfy at least one portion of the received order corresponding to the at least one portion of the order instance.

Other embodiments, aspects, features, objectives and advantages of the present invention will be understood and appreciated upon a full reading of the detailed description and the claims that follow.

DETAILED DESCRIPTION OF THE PREFERRED EMBODIMENT

Figure 1:
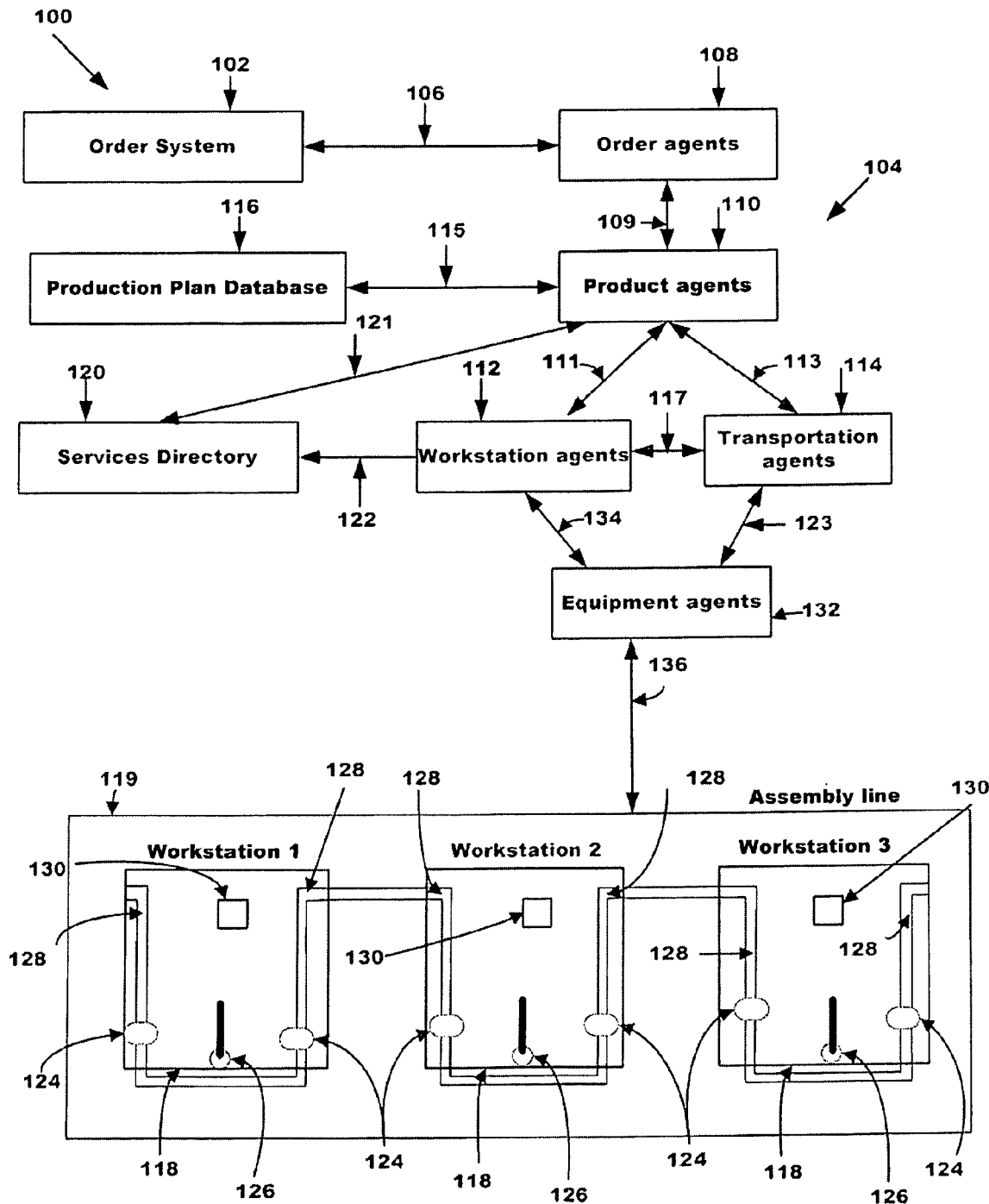
FIG. 1 is a schematic representation of an exemplary industrial control system having multiple components including multiple agents that are capable of interacting with one another, in accordance with at least some embodiments of the present invention.

Referring to FIG. 1, an exemplary industrial control system 100 is shown, in accordance with at least some embodiments of the present invention. In particular, the industrial control system 100 is a distributed control system (or distributed manufacturing control system) that includes an order system 102, a plurality of agents 104, and one or more devices that in the present embodiment are shown collectively to constitute an assembly line 119 (although depending upon the embodiment these one or more devices need not constitute an assembly line). As shown, the agents 104 are in communication with both the order system 102 and the assembly line 119, generally as indicated by communication links 106 and 136, respectively. As described in further detail below, the agents 104 operate in a coordinated manner in response to orders received via the order system 102 so as to control and monitor the assembly line 119 as appropriate to produce and/or modify products in fulfillment of the orders.

The customer orders received via the order system 102 can generally relate to a variety of industrial and/or manufacturing processes and/or products. In at least some embodiments, the order system 102 can be a conventional computer system (e.g., a personal computer) or a similar device, such as a human-machine interface (HMI), a graphical user interface (GUI) or other user interface that is capable of interacting with a plurality of users (or, alternatively, other HMI's) for receiving customer orders. In alternate embodiments, the order system 102 also can be in communication with other entities via one or more networks (which can be, for example, fixed/hardwired or wireless networks) by which orders are communicated. Although typically orders originate from human beings, it is envisioned that in at least some circumstances orders will originate from machines such as computers or robots.

As will be described in further detail below, upon receiving one or more customer orders (e.g., a customer order for manufacturing a product), the order system 102 processes those orders to generate logical representations defining the ordered products (e.g., the product specifications) and specifying the attributes of each product to be manufactured, including parameters such as color, size, quantity etc. Based upon the orders, descriptions of the production plans (e.g., manufacturing steps or processes) appropriate for manufacturing the product(s) in accordance with the orders can be obtained. Additionally, transportation and material handling plans or routines to be performed by various manufacturing resources in performing and coordinating the production plans are then further defined.

In order to handle the orders, prepare and execute the production plans, and prepare and execute the transportation and material handling plans or routines, the order system 102 operates in conjunction with the plurality of agents 104. As shown, in the present embodiment the agents 104 include five different types of agents, namely, order agents 108, product agents 110, workstation agents 112, transportation agents 114 and equipment agents 132. It will be understood that typically there will be multiple agents of at least some if not all of these types operating at any given time as part of the industrial control system 100 in relation to one or more orders that are being handled by the industrial control system. Indeed, any arbitrary number of each of these type of agents can be present in any given embodiment or operational circumstance involving the industrial control system 100. However, in at least some embodiment, one or more of these types of agents are not present or only one agent of one or more of these types of agents is present.

In the present embodiment, each of the agents 104 is an autonomous cooperative unit (ACU) created by one or more software routines/components that are operated upon one or more computer system(s) and/or other hardware device(s) (not shown), for example, a programmable logic controller (PLC) or other microprocessor-based device. Although it is possible that each of the agents 104 will be associated with a given respective computer system or hardware device, this need not be the case and, in at least some circumstances, multiple agents will reside on/be supported by the same computer system/hardware device (indeed, all of the agents could reside on the same computer) and/or a given agent will reside on/be supported by multiple computer system/hardware devices. Additionally, in at least some circumstances, an agent can migrate (be migrated) with its data and software routines/components from one device to another device during execution. Each of the agents 104, based upon the software routines/components that govern its respective operations, is capable of providing one or more operations, as described below. In alternate embodiments, the plurality of agents 104 can co-exist with the order system 102 in a single hardware device as well.

Each of the agents 104 is capable of proactive and reactive behaviors in relation to one or more of the other agents in order to adapt the control system 100 to different tasks and to adjust in response to the occurrence of unforeseen conditions. More particularly, each of the plurality of agents 104 is autonomous such that it makes its own decisions, is responsible for carrying out its decisions toward successful completion, and/or controls and/or monitors physical equipment assigned to it (to the extent such equipment is assigned to it). Also, each of the agents 104 is capable of cooperating with other agents to adapt and respond to diverse events and mission goals by adjusting its behavior and that of any equipment(s) it controls. In at least some circumstances, various ones of the agents 104 are created in response to (and/or ultimately eliminated by) the order system. 102 or even by others of the agents.

Such cooperation and interaction among the agents 104 is desirable as it allows the agents to pursue either their individual goals or the common goals of the entire industrial control system 100. Such inter-agent interactions can vary from simple information exchanges, such as, determining the state of processing as a product moves from one piece of physical equipment to another, to complex negotiations for performing a particular operation. As will be described in further detail below, in accordance with embodiments of the present invention, such cooperation and coordination of agents' behavior in particular allows for the receiving and handling of orders, development and execution of production plans, and related development and execution of transportation and material handling plans or routines.

Still referring to FIG. 1, logical representations of orders received at the order system 102 from outside of the industrial control system 100 (again, for example, from human beings or machines) are generated by the order system. Upon generating the logical representations of the orders, the logical representations are provided via the communication links 106 to the plurality of agents 104 and, more particularly, to the order agents 108. Typically a respective one of the order agents 108 receives and is responsible for handling each respective one of the orders. In at least some cases, a given one of the order agents 108 will be created (that is, an agent of the order agent type will be instantiated) by the order system 102 for the purpose of receiving and handling a given order.

The order agents 108 upon receiving the orders in turn process the logical representations representing the orders and, in response, develop logical representations of one or more product specifications corresponding to the orders. Typically, each product specification will specify the attributes of one particular product (or type of product) to be manufactured in accordance with a given order. That is, a given one of the order agents 108 will typically generate multiple product specifications in response to a given order requesting multiple products (or at least requesting products of multiple types). Upon being generated, the logical representations of the product specifications are sent via communication links 109 to the product agents 110, which serve the purpose of developing and executing production plans according to which the products of the product specifications can be manufactured by the assembly line 119. As with the order agents 108, the product agents 110 can be created (instantiated) and destroyed by the order system 102 or the order agents 108.

The production plans developed by the product agents 110 in the present embodiment are developed in consultation with a production plan database 116 with which the product agents are in communication via communication links 115. Each production plan typically includes one or more production operational steps that, upon being performed under the control of a respective one of the product agents 110, results in production of the specified product(s) for which the production plan was developed. As with the orders received from the order system 102 and the product specifications provided by the order agents 108, the production plans in the present embodiment are in accordance with a logical representation format, as described further below.

Generally speaking, the production plan database 116 is pre-programmed with a plurality of generalized production plans corresponding to a variety of types of products. Thus, upon receiving a given product specification, a given one of the product agents 110 can determine the product type from the product specification and fetch a corresponding generalized production plan from the production plan database 116 suitable for governing the manufacture of that product type. Upon receiving the generalized production plan, the given product agent 110 then instantiates a particular production plan for the ordered product. (Alternatively, in at least some circumstances, the production plan database 116 itself can instantiate a particular production plan for the ordered product and send this instance to the product agent 110.) In the event that the production plan database 116 does not have a generalized production plan corresponding to the product type specified within the product specification (e.g., due to receiving an order for a new product for the first time), new production plans can be created and uploaded into the database for use by the product agent.

Upon fetching the production plans from the production plan database 116, the product agents 110 further interact with the workstation agents 112 via communication links 111 and the transportation agent 114 via communication links 113 to determine which resources/physical equipment of the assembly line 119 will perform/process particular operational steps specified in the production plans and, ultimately, to cause execution of those operational steps of the production plans. As shown, in the present embodiment, the assembly line (or other manufacturing system) 119 can be understood to include a plurality of workstations (which also can be referred to as work cells, workplaces, cells, manufacturing cells, etc.) 118. Each of the workstations 118 can be considered as including and governing multiple manufacturing resources or physical equipment. The number(s) and type(s) of resources and/or equipment that are present in any given workstation 118 can vary considerably depending upon the embodiment and operational circumstance.

For example, in the present embodiment, each of the workstations 118 is equipped with a pair of docking stations 124, a transportation robot 126 that controls the movement of materials, products or semi-products (partially-completed portions of products) from one physical equipment to another, and a machine (not shown) for performing the actual operation. Conveyor belts 128 for transporting the materials, products or semi-products from one piece of equipment to another within the respective workstations 118 (under control of the respective transportation robots 126), between multiple workstations and/or to respective storage units 130 of the respective workstations can additionally be present. Although each of the work stations 118 are shown to have the same resources/equipment in the present embodiment (which could be advantageous in terms of redundancy), this need not be the case in alternate embodiments. Indeed, depending upon the embodiment, any of a variety of different manufacturing resources/equipment capable of providing any of a wide variety of services can be present in any number of different workstations having the same or different capabilities.

As shown figuratively in FIG. 1, each of the workstation agents 112 more particularly governs the various resources/equipment within a respective one of the workstations 118 by way of one or more of the equipment agents 132. As mentioned above, although FIG. 1 shows only one of each of these types of the agents 112, 132, again it will be understood that typically multiple workstation agents are present in any given industrial control system and often, if not typically, multiple equipment agents are governed by any particular workstation agent. As shown, the workstation agents 112 are in communication with the equipment agents 132 by way of communication links 134 while the respective equipment agents 132 are in communication with the resources/equipment of the workstations 118.

More particularly, each of the equipment agents 132 is dedicated to governing the operations of one or more particular resources (e.g., the docking system 124, the robot 126, etc.) of one of the workstations 118 (or, in some embodiments, possibly multiple workstations). In at least some embodiments, a dedicated equipment agent for each type of manufacturing resource within a workstation can be present. In other embodiments, one equipment agent can govern multiple resources/pieces of equipment, and/or a plurality of equipment agents for each manufacturing resource can be present as well. Again, while in the present embodiment only three workstations 118 are shown, each of which includes two of the docking stations 124, one of the robots 126, two of the conveyor belts 128, and one of the storage components 130, this arrangement is merely exemplary and any arbitrary number of resources/equipment and/or number of workstations are possible depending upon the embodiment.

In the present embodiment, the capabilities of each of the workstations 118 (and their associated resources/equipment) are registered with a services directory 120 that is in communication with the workstation agents 112 (and thus indirectly in communication with the equipment agents 132 as well) via communication links 122. Further, the services directory 120 is also in communication with the product agents 110 via communication links 121. As discussed above, the production plans developed and executed by the product agents typically include one or more operations that are to be performed by the workstations 118 and, more particularly, by the resources/equipment of the workstations. By virtue of the registration of the various operations and capabilities of the various workstations 118 (and their associated resources/equipment) at the services directory 120, the product agents 110 are able to query the services directory to determine one or more appropriate workstations for carrying out various operations in accordance with the production plans.

More particularly, each of the product agents 110 can generally determine one or more appropriate ones of the workstations 118 that are suited to perform specific operations by generating complex queries (e.g., "find all machines that can drill a hole of 50 mm diameter and 15 mm depth") based upon their respective production plans and directing those queries to the services directory 120 through the communication links 121. Upon receiving queries from the product agents 110, the services directory 120 performs matchmaking operations to determine which of the workstations 118 are capable of providing the requested services (often, if not typically, more than one of the workstations are capable in this regard), and sends this information back to the product agents 110.

Upon receiving this information, the product agents 110 contact the appropriate workstation agents 112 associated with the appropriate workstations 118, and the contacted workstation agents in turn bid on the requests from the product agents 110. The workstation agents 112, as part of the biding process, typically are in communication with the subordinate equipment agents 132 by way of the communication links 134 so as to confirm that the equipment agents (and thus the resources/equipment controlled by those equipment agents) are capable of performing the operations with respect to which the workstation agents are bidding, and to determine how much the workstation agents bid.

The determinations made by the product agents 110 as to which the workstation agents 112 will be selected to perform particular operations in accordance with their respective production plans can be based upon various factors depending upon the embodiment. In at least some embodiments, cost estimates for performing a requested operation are generated by the respective workstation agents 112 that are bidding on handling that operation, and those cost estimates are provided to the product agent 110. Further, assuming that the product agents 110 make selections purely based upon cost, the product agent receiving the bids then selects the appropriate workstation agent (and associated workstation, equipment agent(s) and resources/equipment) for performing the operation as that one of the workstation agents which provided the lowest cost estimate. Thus, for each step of a given production plan, the services directory 120 can be polled by the one of the product agents 110 handling that production plan, and one or more suitable workstations 118 for that respective step can be selected.

Once appropriate one(s) of the workstations 118 have been selected by a given one of the product agents 110 to perform one or more particular operations in accordance with a production plan of that product agent, the product agent then further ensures transportation of material, products or semi-products to and from the selected workstation(s) by establishing appropriate relationship(s) with one or more of the transportation agents 114 via the communication link 113. As shown, the transportation agents 114 generally also are in communication with (or at least capable of entering into communications with) the workstation agents 112 via communication links 117 and/or, via communication links 123, with the equipment agents 132 that control particular resources/pieces of equipment (e.g., the conveyor belts 128 and the docking stations 124) forming portions of the workstations 118.

By virtue of the communications occurring between the transportation agents 114 and the workstation agents 112 and/or equipment agents 132, the transportation agents 114 are able to determine optimal transportation routes between multiple workstations 118, and/or possibly between particular multiple resources/pieces of equipment within such workstations, so as to minimize transportation time and delay. That is, in response to a request from a given one of the product agents 110 to determine an optimal transportation arrangement for a given product or semi-product, the transportation agents 114 are able to work in cooperation with the product agent 110, the workstation agents 112, and/or the equipment agents 132 so as to identify one or more such options in this regard and then to select a preferred option that is adopted by the product agent. Depending upon the embodiment, the transportation agents 114 or the product agents 110 can make these selections, and communication from the transportation agents to the product agents can involve either selected transportation and material handling plans or routines, or merely information based upon which the product agents can select appropriate plans or routines for those purposes.

Selection and execution of appropriate production plans and associated transport and material handling plans/routines for manufacturing products by the product agents 110 thus allows for satisfaction of product specifications as generated by the order agents 108 in response to orders received by those order agents from the order system 102. Subsequent to completing all of the operations specified in a given production plan (and any associated transportation and material handling plan(s)/routine(s)), that one of the product agents 110 which is executing the production plan can notify that one of the order agents 108 from which that product agent received a product specification that the production plan has in fact been completed. That one of the order agents 108 can in turn notify the order system 102 regarding the completion of the order. Often, though not necessarily, one or more of the order agents 108 and the product agents 110 are subsequently terminated upon satisfactorily completing the orders with respect to which they have been responding. Additionally, it is also possible that the workstation agents 112, transportation agents 114 and/or equipment agents 132 can be terminated as well, although this is less commonly the case since typically these agents will remain in existence since they are linked directly or indirectly with particular resources/pieces of equipment.

As noted above, while FIG. 1 shows only a single one of the different types of agents 108, 110, 112, 114, and 132, depending upon the embodiment multiple instances of one or more of those agents can be (and typically are) present. Further, the communication links 106, 109, 111, 113, 115, 117, 121, 122, 123, 134 and 136 linking those agents with one another and with the order system 102, production plan database 116, services directory 120 and assembly line 119 can include any number of discrete links that involve any type or number of different communications technologies including, for example, one or more wired or wireless communication links, Ethernet, ControlNet, DeviceNet-type or other networks (which can potentially including the World Wide Web or involve internet-type technologies), and a variety of other technologies. Multiple redundant communication links to resist failures can be provided as well.

Also, notwithstanding the fact that in the present embodiment a single order system 102 for receiving customer orders has been shown, in other embodiments, multiple order systems can be employed, with each being capable of receiving customer orders and parsing those orders to generate logical representations of those orders. Again, the order systems 102 can be configured for communication with users that are human beings as well as machines (e.g., remotely-located computers coupled to the order systems by way of networks) or other entities. When orders are completed and the completion status is indicated to the order system(s) 102, the order systems can in turn communicate this status to the human beings or other users that placed the orders.

From the above description, it should be apparent that executing the production of a product in response to a customer order by way of the industrial control system 100 requires significant interaction and cooperation of the various types of agents 104 with one another. To enable such interaction and cooperation among the various agents 104, a logical representation scheme allowing for standardized syntax and semantics is employed by the agents in their communications with one another. More particularly, in accordance with at least some embodiments of the present invention, the logical representation scheme that is employed by the agents 104 is an ontology-based logical representation scheme, which can be generally understood to constitute a formal explicit specification of a shared conceptualization of concepts, relations and restrictions. By virtue of this ontology-based logical representation scheme, the various agents 104 are capable of communicating in a standardized manner, in accordance with a "common language", as described in further detail below.

In the present embodiment, the syntax of the ontology-based logical representation scheme employed by the agents 104 is described in terms of the Web Ontology Language (or "OWL"). The OWL provides an instrument by which it is possible to express static, invariant (or substantially invariant) classes (or concepts), their relations and attributes, which are particularly referred to as an ontology (or multiple ontologies), and additionally possibly to express the dynamic model of the real world referred to as a knowledge base or scene. The knowledge base or scene in particular can be considered as containing particular examples or instances of ontology concepts so as to capture a particular state of a selected part of reality. For example, an ontology can state that a "machine" "provides" an "operation", while a "machine M25" that "provides" a "drilling operation" is an example of a knowledge base.

It can be noted additionally that, while typically the ontology or ontologies of the OWL are designed a priori, the knowledge base is often built partly or entirely by one or more agents in dynamic manner as they perceive the real world by means of sensors, communication (e.g., through sharing of knowledge bases) or possibly through user interaction (e.g., through human-machine systems). For example, a given order ontology or production plan ontology can preexist the operation of the industrial control system 100, or at least preexist the creation of one or more of the agents 104. However, a given instance of an order that is included as part of the knowledge base often will only be created by the order system 102 upon receiving an order request. Likewise, a given instance of a production plan that is part of the knowledge base, in response to a requested order, can depend upon information found in the services directory 120 regarding the operational capabilities of the workstations 118, which can evolve over time.

In terms of the storage and handling of the ontologies and instances of ontologies, the ontologies can be understood as formats for organizing data into data conglomerations or data structures. Instances of the ontologies in turn can be considered data structures formatted in accordance with the relevant ontologies and having particular information associated with particular portions or blocks (e.g., as described below, classes/subclasses, relations, etc.) of the data structures. In at least some embodiments of the present invention, one or more order ontologies, one or more production plan ontologies and one or more transportation ontologies are recognized and/or utilized by the system, and respective data structures for one or more order instances, one or more production plan instances and one or more transportation ontology instances are created and utilized as a basis for controlling operations of an industrial system/process. As will be described in further below, in the present embodiment each of the order ontologies, production plan ontologies and transportation ontologies bears a certain resemblance to one another (and indeed, in some cases, certain portions of data structures of those different ontologies are identical or shared). Nevertheless, in other embodiments this need not be the case.

The use of an ontology-based solution to allow for communications among the agents 104 (and possibly other devices as well) is advantageous particularly in terms of its openness and flexibility, which among other things allows the agents 104 to dynamically adapt to new orders and to dynamically create and reconfigure production processes and transportation and material handling plans/routines so as to be suitable for producing a variety of products. The ontology-based scheme readily allows for many different instances of particular knowledge bases/scenes to be created and acted upon, without changing the overall ontology and also without making changes to the software or hardware defining operation of the agents 104. That is, generally speaking, implementation and usage of the ontology-based scheme by a given agent does not require either modification of the agent program code, or any other complicated reconfiguration of the industrial control system 100.

The same ontology-based solution can also be used even though there are significant changes in the industrial facility or facilities that are making products in accordance with the received orders. For example, even though there are changes to the assembly line 119, such as the installation of new equipment on the factory floor or replacement of old equipment, use of the same ontology-based scheme (albeit with modified knowledge bases/scenes) is still feasible. New workstation agents and equipment agents can be created easily after installation of new equipment, with the workstation agents in particular registering their services in the services directory 120 so as to allow those agents to be discovered by the product agents 110.

Figure 2A:
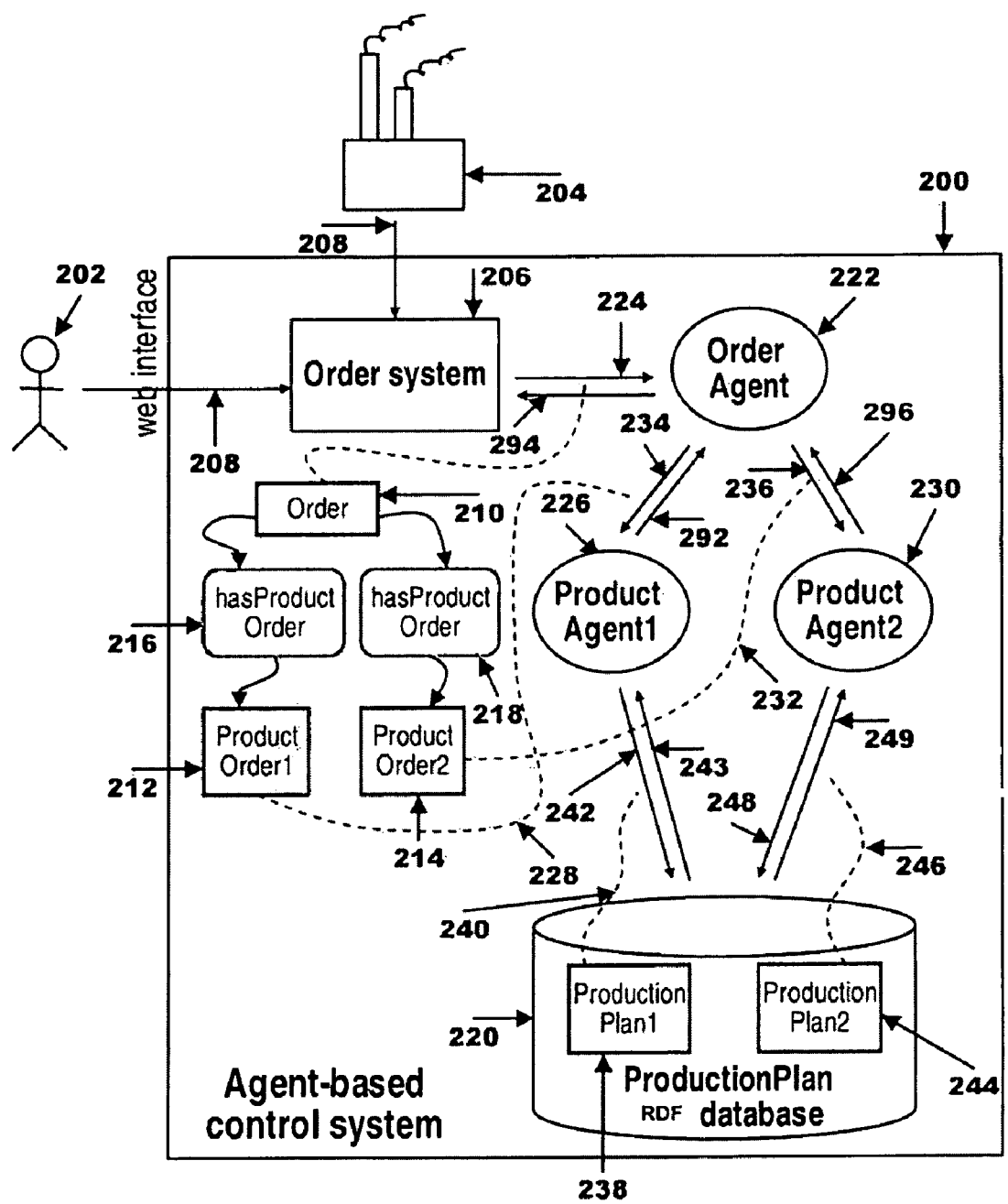
FIGS. 2A and 2B show exemplary interactions among various agents of the industrial control system of FIG. 1 for fulfilling an order for one or more products, in accordance with at least some embodiments of the present invention.
Figure 2B:
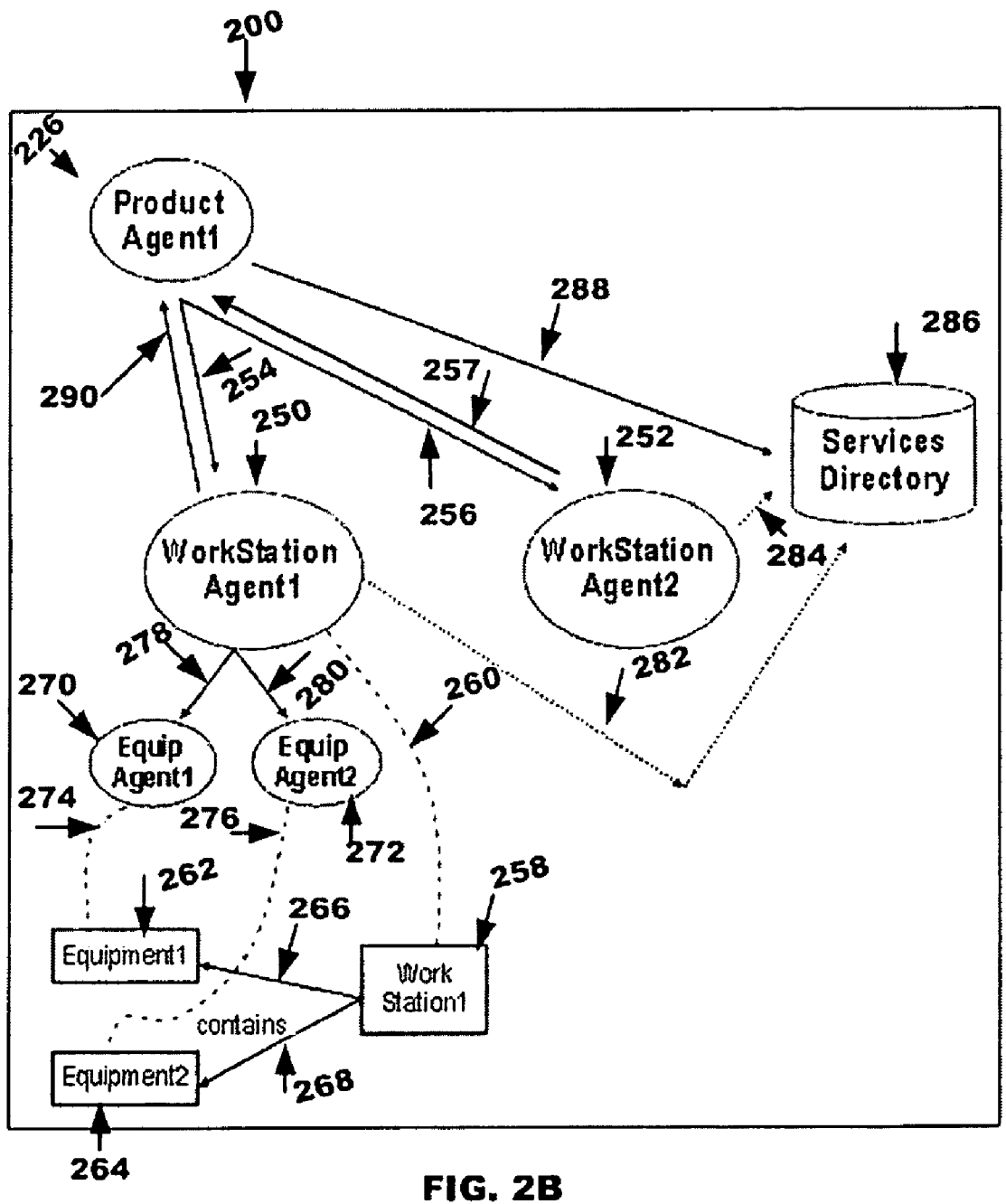

Turning now to FIGS. 2A and 2B, exemplary operations of an exemplary industrial control system 200 corresponding to the general form of the industrial control system 100 of FIG. 1 are shown schematically in more detail, in accordance with at least some embodiments of the present invention. FIGS. 2A-2B are particularly intended to highlight exemplary interactions among various agents of the system 200 as they communicate with one another in accordance with an ontology-based logical representation scheme and, based upon those communications, operate to produce one or more products in response to a received order request. FIG. 2A in particular shows exemplary communications among (and resulting operations by) an order system 206, an order agent 222, first and second product agents ("ProductAgent1" and "ProductAgent2") 226 and 230, respectively, and a production plan database 220 ("ProductionPlan RDF database") of the industrial control system 200, which respectively are examples of the order system 102, order agents 108, product agents 110, and the production plan database 116 of FIG. 1.

Additionally, FIG. 2B shows exemplary communications among one of the product agents of FIG. 2A, namely the first product agent 226, and first and second workstation agents ("WorkStationAgent1" and "WorkStationAgent2") 250 and 252, respectively, which are examples of the workstation agents 112 of FIG. 1. Further as shown, the workstation agents 250, 252 are in communication with a services directory 286 and also with first and second equipment agents ("EquipAgent1" and "EquipAgent2") 270 and 280, respectively, which are examples of the equipment agents 132 of FIG. 1. Also as shown, the first workstation agent 250 is in communication with (and controls and/or monitors) a workstation 258 having first and second pieces of equipment 262 and 264, respectively, which in turn are in communication with the first and second equipment agents 270 and 272, respectively. The workstation 258, and pieces of equipment 262, 264 can be considered an alternative embodiment of the workstations/equipment shown in the assembly line 119 of FIG. 1.

As shown in FIG. 2A, operation of the industrial control system 200 begins in relation to a particular product order when the product order is received by the industrial control system 200 at the order system 206. Typically, a given product order includes the specifications and quantity of the product(s) to be manufactured (e.g., one of a product A and two of a product B), and is provided by a human user 202 (e.g., via a HMI device) or another entity (e.g., a company 204, or a machine) to the order system 206, as illustrated by arrows 208. Upon receiving a given order, the order system 206 processes and converts that order into an OWL based knowledge base representation that is an order instance 210, which specifies the order received by the order system 206 in accordance with the order ontology employed by the industrial control system 200. Upon being generated, the order instance 210 is then transmitted to the order agent 222 as represented by an arrow 224.

The order agent 222 can be generated dynamically by the order system 206 when the order system initially receives/processes the order or, alternatively, an existing order agent can be employed. Although typically one order agent is generated per order, this need not always be the case. Rather, in other embodiments, multiple order agents per order can be generated. Alternatively, it is also possible that one order agent could handle multiple orders. In the present embodiment, upon providing of the order to the order agent 222, the order agent is then able to identify specific product orders that are within that order, it being understood that any given order can concern one or more than one product and/or types of products. When multiple type of products are identified by the order, the order agent 222 divides up the order into respective product orders concerning those different types of products.

Depending upon the number of types of ordered products, the order agent 222 then communicates and operates in conjunction with one or more product agents. In the present embodiment, where the order instance 210 received by the order agent 222 concerns two different types of products (a Product 1 and a Product 2), the order agent in particular communicates and operates in conjunction with the first and second product agents 226 and 230, respectively. More particularly as illustrated, the order agent 222 communicates, as represented by an arrow 234, a first product order instance (ProductOrder1) 212 to the first product agent 226 and further communicates, as represented by an arrow 236, a second product order instance (ProductOrder2) 214 to the second product agent 230.

The respective product order instances 212, 214 can be considered subsets/subportions of the information included in the order instance 210. As such, the respective product order instances 212, 214 can also be considered instances (or knowledge bases/scenes) of a product order ontology that is a subset or subportion of the order ontology used to represent orders. Depending upon the embodiment or operational circumstance, the product agents 226, 230 can preexist the arising of the order instance 210 or, as is the case in the present embodiment, the product agents can be created by the order agent 222 for the purpose of receiving and handling the specific product order instances 212, 214. Typically, one product agent is employed per product order instance (e.g., per type of product that is ordered), albeit the number of product agents used can vary from one to any arbitrary number and there need not be a one-to-one correspondence between the number of types of products ordered and the number of product agents.

Figure 3:
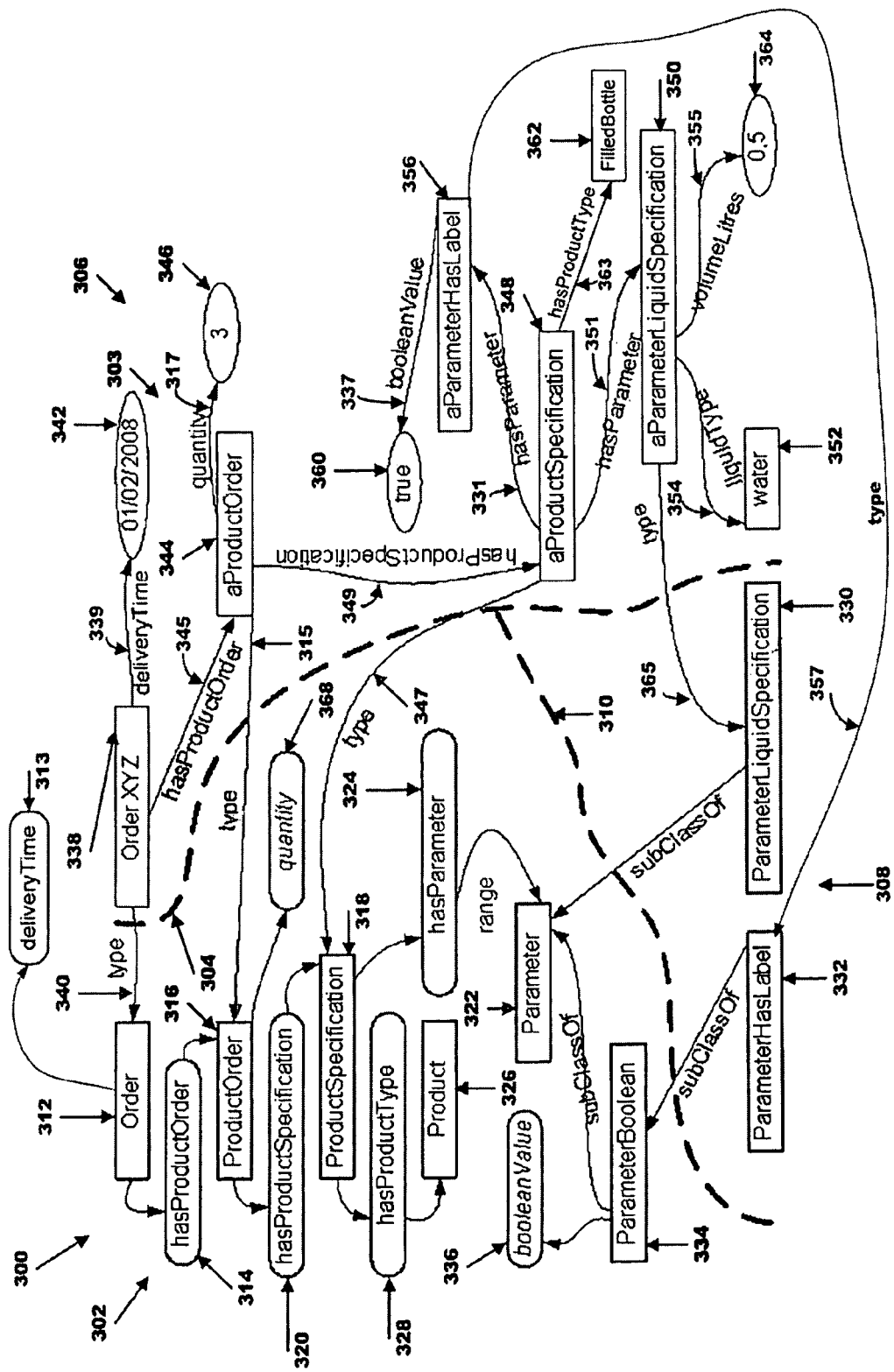
FIG. 3 is a schematic representation of an exemplary order ontology that can be employed to allow communications among various agents of the industrial control system of FIGS. 1-3, along with an exemplary order formatted in accordance with such an ontology, in accordance with at least some embodiments of the present invention.

The particular nature and arrangement of an order ontology, product order ontology and instances thereof can vary widely depending upon the embodiment and operational circumstance. Referring additionally to FIG. 3, an exemplary order ontology 300 for an incoming order and an exemplary order instance (or knowledge base/scene of that ontology) 306 are shown, with the order ontology 300 being generally to the left of a dashed line 304 and the instance 306 being to the right of the dashed line. With respect to the order ontology 300, it provides a generalized format for defining the orders and product orders (and associated product specifications) that can be communicated among, and acted upon by, an order system such as the order system 206 and agents such as the order agent 222 and the product agents 226, 230. The order ontology 300 typically remains unchanged (or substantially unchanged) for each order. The order ontology 300 can be understood to include the ontology of the overall order and also, as a subset or subportion of that ontology, a product order ontology 302.

As for the order instance (or knowledge base/scene) 306 of the order ontology 300, it is a specific example of an order that is represented in accordance with the format specified by the order ontology 300. In this particular example, the order instance 306 can be considered as an example of the order instance 210 of FIG. 2A and, in particular, concerns an order for 3 filled 0.5 Liter bottles of water for delivery by Jan. 2, 2008. Just as the order ontology 300 includes subset/subportions that can be referred to as the product order ontology 302 (that is, a product order ontology is simply a portion of the order ontology), the order instance 306 in the present embodiments includes subsets/subportions of information that correspond to that product order ontology 302 and can be considered a product order instance 303 (that is, a product order instance is simply a portion of an order instance).

Further as shown in FIG. 3, the order ontology 300 is a formal representation of a set of concepts or classes within a domain and relationships between those classes. Relationships between classes in an ontology specify how those classes are related to one another and to other classes within the ontology. Classes can subsume or be subsumed by other classes, such that a class subsumed by another class is called a subclass. By defining classes, subclasses and relations among those classes/subclasses (these relations can also be referred to as "class relations" or "object properties"), a hierarchical representation (e.g., tree-like structure) of incoming orders that clearly depicts relationship between the various classes can be created, as exemplified in FIG. 3 and described below. Additionally, it is possible for other relations to be specified between given classes/subclasses and literals (these can also be referred to as "class/literal relations", or alternatively "datatype properties"). As for the order instance 306, it particularly includes data elements or portions that correspond to the particular classes/subclasses and/or relations of the order ontology 300, as signified additionally by type pointers included as part of the instance. That is, the order instance 306 includes not only particular first portions of information corresponding to the different classes/subclasses/relations of the order ontology 300 but also includes additional portions of information signifying the classes/subclasses/relations to which those first portions of information pertain.

In the exemplary embodiment of FIG. 3, the order ontology 300 has several classes in particular. Among these is an Order class 312. In some embodiments, the Order class 312 can include a deliveryTime relation 313, which is a class/literal relation that pertains to the date and/or time when the order received by the order system 206 is to be delivered. Each Order class 312 is additionally related by a hasProductOrder relation 314 (which is a class relation) to one or more ProductOrder classes 316, one of which is shown in the order ontology 300. Typically, a respective instance of the Product Order class 316 is created for each product type indicated in a received order. Further, each of the ProductOrder classes 316 can further include a quantity relation 368, which is a class/literal relation that defines the quantity (e.g., number) of the desired product to be manufactured, and also can be related to one or more ProductSpecification classes 318 by way of one or more corresponding hasProductSpecification relations 320 (which are class relations).

The ProductOrder class 316 and all of the additional related classes included therein (or at least the ProductSpecification classes 318 and all of the additional classes included therein), are the particular portions of the order ontology 300, instances of which are provided from an order agent to the product agent(s). Just as the order instance 306 of FIG. 3 can be considered an example of the order instance 210 of FIG. 2A, likewise the product order instance 303 of FIG. 3 can be considered an example of either of the first and second product order instances 212, 214 (rather than the order instance 210 itself) that are respectively provided from the order agent 222 to the first and second product agents 226 and 230, respectively, in FIG. 2A. Just as the respective first and second product order instances 212 and 214 are related to the order instance 210 by way of first and second hasProductOrder relations 216 and 218, respectively, the product order instance 303 of FIG. 3 is related to the order instance 306 of FIG. 3 by way of a hasProductOrder relation 345.

Further as shown in FIG. 3, each of the ProductSpecification classes 318 uses additional relations to set forth particular features of the product to be manufactured in accordance with the order received by the order system 206. In this regard, each of the ProductSpecification classes 318 relates to a Product class 326 by way of a respective hasProductType relation 328. Each of the Product classes 326 indicates the type of product being ordered. Information contained in an instance of such a class is employed by the respective product agent (e.g., the product agent 226) receiving that information to extract/download a production plan corresponding to that product type from a database (e.g., the production plan database 220 of FIG. 2A).

Additionally, each of the ProductSpecification classes 318 additionally can include one or more Parameter classes 322 by way of respective hasParameter relations 324. Each of the Parameter classes 322 describes one or more parameters (e.g., specifications) associated with the product, and at this level can typically be fairly product-specific. In the present embodiment, the Parameter class includes, as subclasses, one or more ParameterBoolean classes 334 and one or more ParameterLiquidSpecification classes 330. Each ParameterBoolean class 334 in turn includes a booleanValue relation 336 (that is a class/literal relation) and additionally includes, as a subclass, a ParameterHasLabel class 332. As the names of these classes would suggest, the ParameterBoolean class 334 is intended to include information regarding a selectable feature concerning the product, the booleanValue relation 336 includes a value (e.g., True or False) representative whether that feature should actually be included with the product, the ParameterHasLabel class 332 is intended to include information regarding a label that can (but need not) be provided on the product (depending upon the value of the booleanValue relation), and the ParameterLiquidSpecification class 330 is intended to include information regarding a liquid to be included with the product.

From the particular exemplary classes shown as part of the exemplary order ontology 300 (and particularly the product order ontology 302), it should be evident that in many if not all circumstances a particular ontology can have classes that are particularly pertinent to particular types of products. In the present example, where as mentioned above (and as described further below) the instance 306 concerns an order for 3 filled 0.5 Liter bottles of water for delivery by Jan. 2, 2008, the classes of the product order ontology 302 listed beneath a dashed line 310, particularly the ParameterHasLabel class 332 that is a subclass of the ParameterBoolean class 334 and the ParameterLiquidSpecification 330, are particularly an extension of the order ontology 300/product order ontology 302 to cover parameters needed for specifying the product specification of the filled bottle and suited for this type of bottled water product.

That is, the dashed line 310 is intended to represent a distinction between those classes/relations of the order ontology 300 (in this example, the ParameterHasLabel class 332 and the ParameterLiquidSpecification class 330) that are appended to standard classes/relations of the order ontology (in this example, all of the other classes and relations of the order ontology). These appended/extended classes can be, in at least some cases, subclasses of the standard classes (e.g., the ParameterLiquidSpecification class 330 is a subclass of the Parameter class 322). So that such various classes (or subclasses) are available to and understood by the industrial control system 200, it is typically desirable that the order ontology 300 be sufficiently highly developed in terms of available classes (or subclasses) and relations such that all classes (or subclasses) and relations necessary for representing any given types of products with respect to which orders will be received are a priori programmed upon and recognizable by the industrial control system. Nevertheless, extensions/appendages to the order ontology 300 can be also added during system run.

Assuming that the order ontology 300 and product order ontology 302 shown to the left of the dashed line 304 of FIG. 3 are employed, many different order instances/product order instances are possible that will depend upon the particular orders received by the order system 208 from the outside world (e.g., from the entities 202, 204 of FIG. 2A). The conversion of an incoming order received by the order system into an order that is in accordance with the order ontology 300 can be achieved, in at least some embodiments, in an automatic or semi-automatic manner. For example, in least some circumstances, the order information received at the order system 206 are in a machine processable format, such as that of a database, an ordering system in an online-shop, B2B messages in XML form, and the like, which can be easily converted into an OWL based logical representation format (or other ontology). The order system 206 can be pre-programmed for receiving orders in those formats by way of plug-ins (or modules) that are specific to such formats and/or particular communication channels. By virtue of utilizing a plug-in architecture for receiving orders via the order system 206, it is possible to easily modify/upgrade the order system so that the order system is capable of receiving order information in accordance with a variety of formats/communication channels.

Further with respect to FIGS. 2A and 3, for example, an incoming order received by the order system 206 for filling 3 bottles with 0.5 Liters of water each for delivery by Jan. 2, 2008 can in one embodiment take the following Hypertext Transfer Protocol (HTTP) data format: deliveryTime=Jan. 2, 2008 & productType=filledBottle & hasLabel=true & liquidType=water & volumeLiters=0.5. Upon receiving the order in the format specified above, an appropriate plug-in in associated with the order system 206 can easily parse this order, particularly by looking for deliveryTime, productType, hasLabel, liquidType and volumeLitres strings for conversion into OWL instances in correspondence with the general order ontology classes described above. In other embodiments, other types of data formats for receiving orders via the order system 206 can be employed as well. Regardless of the data format of the received order information, based upon this information provided to the order system 206, the order instance (or knowledge base/scene) 210, 306 corresponding to the received order can be generated, where the order instance is in accordance with the order ontology 300.

Given the aforementioned incoming order for 3 filled 0.5 Liter bottles of water for delivery by Jan. 2, 2008 and the exemplary order instance 210, 306 corresponding to that order, it will be noted that the order instance includes several portions of information that pertain to the different classes/subclasses/relations of the order ontology 300. In particular, these include a name, as represented by an Order XYZ instance 338 specifying that the name of the order is "Order XYZ", which also includes specification of a delivery date 342 by way of a deliveryTime relation 339, which corresponds to the deliveryTime relation 313 of the order ontology 300. That the Order XYZ instance 338 corresponds to the Order class 312 is made clear by an additional indicator included with that instance, namely, a "type" indicator 340 indicating that the Order XYZ instance is of the Order class 312.

Also as shown, an aProductOrder instance 344 is an instance of the ProductOrder class 316 as shown by a type indicator 315, and that is linked to the Order class instance 338 by way of a hasProductOrder relation 345 corresponding to the hasProductOrder relation 314 of the order ontology 300. The aProductOrder instance 344, plus further instances and relations possessed by that instance as described further below, can be understood to constitute the product order instance 303 that corresponds to the product order instance 212 provided to the first product agent 226 of FIG. 2A.

In the present example, the aProductOrder instance 344 includes a quantity relation 346 specifying that 3 of the bottles are to be made. That the quantity relation 346 in fact corresponds to the quantity relation 368 of the order ontology 300 is made clear by a quantity relation indicator 317. The aProductOrder instance 344 further includes an aProductSpecification instance 348 that is possessed by the aProductOrder instance by way of a hasProductSpecification relation 349. That the aProductSpecification instance 348 is an instance of the ProductSpecification class 318 of the order ontology 300 is made evident by a type indicator 347. The aProductSpecification instance 348 additionally includes a FilledBottle instance 362 that relates to the aProductSpecification instance by way of a hasProductType relation 363, and that corresponds to the Product class 326. The FilledBottle instance 362 in particular makes it clear that the product of interest is a filled bottle.

Further, the aProductSpecification instance 348 further includes relations to instances that specify characteristics of the products of interest (the filled bottles), namely, an aParameterLiquidSpecification instance 350 and an aParameterHasLabel instance 356, which are respectively related to the aProductSpecification instance 348 by way of hasParameter relations 351 and 331, respectively. As represented by type indicators 365 and 357, respectively, the aParameterLiquidSpecification instance 350 is an instance of the ParameterLiquidSpecification class 330 while the aParameterHasLabel instance 356 is an instance of the ParameterHasLabel subclass 332.

The aParameterLiquidSpecification instance 350 in particular specifies by way of a liquidType relation 354 that the liquid to be provided in the bottles is water, as represented by a water instance 352, and also specifies by way of a volumeLitres relation 355 that the amount of liquid to be provided in each of the bottles is 0.5 Liters, as represented by a 0.5 instance 364. Although the water instance 352, the 0.5 instance 364 and the corresponding liquidType relation 354 and the volumeLitres relation 355, respectively, have not been shown in the order ontology 300 (or product order ontology 302), it will be understood that each of these instances and their relations are in fact present in the ontology, and have merely not been shown for clarity of expression. As for the aParameterHasLabel instance 356, as indicated by a booleanValue relation 337, a value of true 360 indicates that a label should in fact be provided.

It should be noted that, by virtue of specifying that the aParameterHasLabel instance 356 is an instance of the ParameterHasLabel class 332, the order system 206 can automatically derive that the aParameterHasLabel instance 356 is also an instance of a subclass of the ParameterBoolean class 334 and an instance of a subclass of the Parameter class 322. Thus, in the present embodiment, the aParameterHasLabel instance 356 is sufficient to represent an instance not only of the ParameterHasLabel class 332, but also of the ParameterBoolean and the Parameter classes 334 and 322, respectively, and consequently no specific instances of the ParameterBoolean and Parameter classes are shown in the order instance 306. That said, in other embodiments, respective distinct instances corresponding to each of the ParameterhasLabel, ParameterBoolean and Parameter classes can be present.

FIG. 3 thus illustrates how information concerning an incoming order can be extracted by the order system 206 and formatted as the order instance 210, 306 in accordance with the generalized order ontology 300 in such a manner that the information is then processable and usable first by the order agent 222. FIG. 3 additionally illustrates how that order instance 210, 306 can then, upon being processed by the order agent 222, be converted into the product order instance 212, 303 for submission to the first product agent 226, where the product order instance can then serve as a basis for determining production plan(s) appropriate for producing the ordered product(s).

Referring again to FIG. 2A, the product agents 226, 230 are responsible for developing and scheduling operations for manufacturing the products specified in the product order instances transmitted thereto (namely, the product order instances 212, 214, with the product order instance 212 being also the product order instance 303 of FIG. 3). In this regard, the respective product agents 226, 230 can send respective inquiries 242, 248 for appropriate production plan(s) to the production plan database 220 and in response receive respective production plan information 243, 249 from the database. For example, the first product agent 226 can download a first production plan 238 ("ProductionPlan1") from the production plan database 220, as indicated by a dashed line 240, while the second product agent 230 can download a second production plan 244 ("ProductionPlan2") from the database, as indicated by dashed line 246. With respect to the production plan database 220 in particular, in the present embodiment it is a Resource Description Framework (RDF) database that contains production plans specifically suitable for governing the manufacture of various product types.

FIG. 2A shows one respective production plan being available in the production plan database 220 that is suitable for each of the respective product agents 226, 230 in terms of serving as a basis for those product agents' governance of the manufacture of the product(s) specified in the product order instances 212, 214 provided to those product agents. Nevertheless, depending upon the embodiment or circumstance, multiple suitable production plans (or possibly no suitable production plans) are available for governing the manufacture of a given product. In cases where multiple suitable production plans are available, the product agent receiving those production plans can select the most suitable one of those production plans (or need not utilize any of them). Often, the production plan (or plans) that are suitable for a given product type can be determined based upon the information within the product order instance corresponding to the Product class 326 of the ontology, for example, the FilledBottle instance 362 of FIG. 3. That is, by virtue of identifying the product type from the knowledge base/product order instance, all of the production plans stored within the production plan database 220 can be searched to find one or more production plans corresponding to that product type.

The production plans 238, 244 downloaded from the production plan database 220, like the order and product order ontologies, typically are in accordance with the same overall ontology-base scheme (e.g., the OWL based ontology scheme) of the industrial control system 200. In some embodiments, the production plans 238, 244 can be in the form of an ontology (rather than an instance of an ontology) and, upon being received by the product agents 226, 230, need to be instantiated as production plan instances appropriate for the manufacture of the products assigned for manufacture to those product agents. In particular, subsequent to the downloading of the production plans 238, 244 to the respective product agents 226, 230, the product agents then populate those production plans with additional information and/or otherwise modify those production plans as appropriate for governing the manufacture of the product types over which those product agents have manufacturing responsibility (albeit, in alternate embodiments, such modifications of a production plan can be performed by the production plan database 116 or possibly another specialized agent or other component/entity) In other embodiments, the production plans 238, 244 can be in the form of an ontology instance. Upon being received by the product agents 226, 230, the production plans 238, 244 in the form of an ontology instance can then be transformed into other production plan instance(s) appropriate for the manufacture of the products specified in the product order specification (including its parameters). Although possible, it is unlikely that a production plan in the form of an ontology instance received by a product agent will be immediately suitable for the purpose at hand without further transformation/instantiation.

Typically, the instantiation of the production plans 238, 244 by the product agents 226, 230 is based at least in part upon one or more parameters from the product order instances 212, 214, 303. That is, typically one or more parameters from the product order instances 212, 214, 303 can be transitioned directly (or converted into or otherwise directly or indirectly implemented) as the parameters of the production plan instances created by the product agents 226, 230. Often these parameters are particular parameters found in the product specification portions of the product order instances 212, 214, 303. For example, the various information associated with the aProductSpecification instance 348 (e.g., the additional subclass information and/or relation information associated or included by that instance, such as the liquidType relation 354 and the 0.5 subclass instance 364) of FIG. 3 can be used for instantiation of a production plan by the first product agent 226 based upon the first production plan 238 received from the production plan database 220. In at least some cases, various rules defining the transition of such parameters from the product specification instance to a particular instantiated production plan can be followed. Such rules can be expressed in languages like CLIPS, SWRL, RIF, etc.

Figure 4:
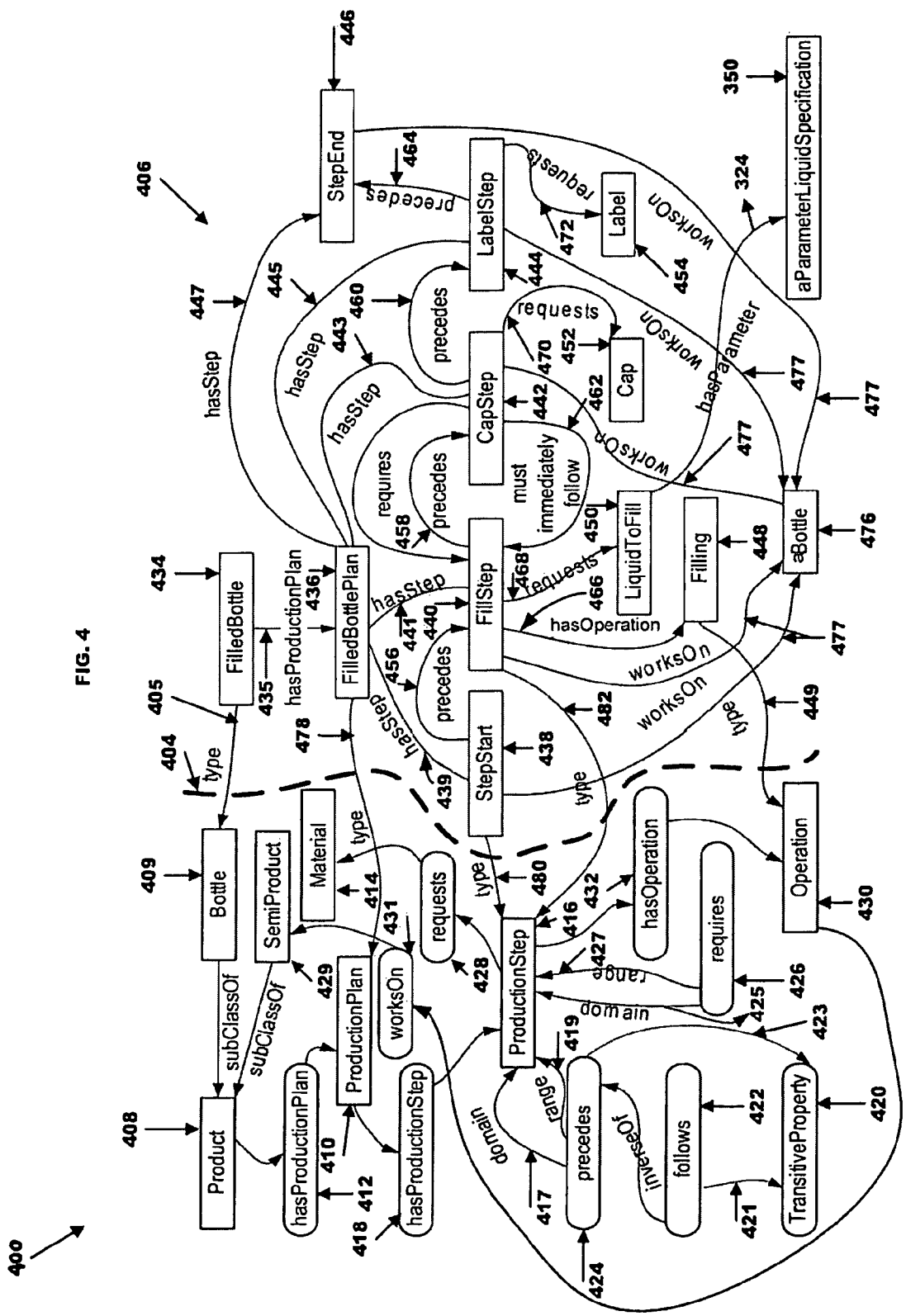
FIG. 4 is a schematic representation of an exemplary production plan ontology that can be employed to allow communications among various agents of the industrial control system of FIGS. 1-3, along with an exemplary production plan formatted in accordance with such an ontology, in accordance with at least some embodiments of the present invention.

Referring now to FIG. 4 in conjunction with FIGS. 2A and 2B, an exemplary production plan ontology 400 as well as an exemplary production plan instance 406 following that ontology is shown, in accordance with at least some embodiments of the present invention. The ontology 400, which is located to the left side of a dashed line 404, can be understood to constitute a general description of a production process. By comparison, the production plan instance 406, which is located to the right side of the dashed line 404, shows an exemplary production plan knowledge base defining the production process for producing bottle(s) with label(s) and filled with a liquid, that is, in accordance with the product order instance 306 of FIG. 3, where an exemplary order for 3 bottles filled with 0.5 L of water for delivery by Jan. 2, 2008 is shown.

As was the case with the order ontology 300 and order instance 306 of FIG. 3, the production plan ontology 400 and production plan instance 406 each include multiple classes/subclasses and relations linking those classes (or otherwise attached to those classes). Referring specifically to the ontology 400, that ontology first includes a Product class 408 indicative of product type. It is generally the case that the Product class 408 corresponds to the Product class 326 of the order ontology 300 of FIG. 3. Additionally, the production plan ontology 400 can include a Bottle class 409, which is a subclass of the Product class 408 and merely distinguishes the type of product (e.g., in this case a bottle) of the Product class 408. In addition, the Product class 408 also includes a ProductionPlan class 410 by way of a hasProductionPlan relation 412. Although only one production plan class (e.g., the ProductionPlan class 410) is shown in FIG. 4, it will be understood that multiple instances of such ProductionPlan classes can be present in the production plan instance 406. The production plan ontology 400 can further include a SemiProduct class 429, which is a subclass of the Product class 408.

The ProductionPlan class 410 in turn can include one or more production steps as represented collectively by a ProductionStep class 416 via a hasProductionStep relation 418. The ProductionStep class 416 defines one or more production/manufacturing steps and, in doing so, can specify additional operations, limitations and properties associated with that step. For example, the ProductionStep class 416 can further define one or more operations involved in a production step by an Operation class 430 via a hasOperation relation 432.

Also, for each production step, the ProductionStep class 416 via one or more relations provides the order in which each given step is to be performed, and the material required for performing that step. In the present exemplary production plan ontology 400, the ProductionStep class 416 determines the order in which a given production step is to be performed relative to other production steps of the production plan by way of a follows relation 422 and a precedes relation 424. The respective follows and the precedes relations 422 and 424 are transitive relations of a TransitiveProperty type 420, as shown by arrows 421 and 423, respectively. Also as shown, the follows relation 422 is additionally an inverse of the precedes relation 424. The aforementioned relations 422 and 424 are examples of information that can be expressed in an ontology and used for automated reasoning by the agents specifying particularly that if a step A precedes a step B and the step B precedes a step C then the step A also precedes the step C. The precedes relation 424 additionally is shown to be linked to the ProductionStep class 416 by a domain 417 and a range 419. The domain 417 and the range 419 in particular limit participation of the various production steps in the production plan ontology 400.

In addition to providing the order of a step relative to other step(s) by way of the follows relation 422 and precedes relation 424, the ProductionStep class 416 can additionally participate in a requires relation 426, which specifies whether the performance of other step(s) is a prerequisite for performing a given step encompassed by the present ProductionStep class. Similar to the precedes relation 424, the requires relation 426 can specify a domain 425 and a range 427 to limit participation of the various production steps represented by the ProductionStep class 416. The ProductionStep class 416 can further specify the material that is required for the completion of a given step by way of employing a requests relation 428 to a Material class 414. Additionally, the ProductionStep class 416 can specify a semiproduct (or product or other item) with respect to which a given step is performed. In this regard, in the present example the Operation class 430 is capable of acting upon one or more semiproducts encompassed by the SemiProduct subclass 429 as indicated by a worksOn relation 431.

As for the production plan instance (or knowledge base) 406, which again is representative of a production plan particularly suited for producing a filled bottle, the production plan instance includes multiple classes/subclasses/instances and relations that correspond to those of the production plan ontology 400. In particular as shown, the production plan instance 406 begins by identifying the type of product being produced in a FilledBottle instance 434. The instance 434 is an instance of the Bottle class 409 as indicated by a type arrow 405, and also corresponds to the FilledBottle instance 362 of FIG. 3. In some embodiments, the FilledBottle instance 434 can directly be an instance of the Product class 408 as well. Further, the FilledBottle instance 434 includes a further FilledBottlePlan instance 436 via a hasProductionPlan relation 435, where the instance 436 is an instance of the ProductionPlan class 410 as indicated by an arrow 478, and the relation 412 corresponds to the hasProductionPlan relation 412.

Additionally as shown, the FilledBottlePlan instance 436 includes five steps, each of which is an instance of the ProductionStep class 416 (as indicated by, among other things, type arrows 480 and 482). These are, namely, a StepStart 438, a FillStep 440, a CapStep 442, a LabelStep 444 and a StepEnd 446, with the relation of these five steps as steps of the FilledBottlePlan instance 436 being illustrated by hasStep arrows 439, 441, 443, 445 and 447, respectively (each of the hasStep arrows can be understood to correspond to the hasProductionStep relation 418). Although in the present embodiment, only the StartStep 438 and the FillStep 440 have been shown as instances of the ProductionStep class 416 via the type arrows 480 and 482, respectively, it will be understood that similar arrows from the CapStep 442 and the LabelStep 444 to the ProductionStep class have not been shown merely for clarity of expression and are contemplated to be present as well.

Additionally, an order of execution for the steps 438-446 is illustrated by additional arrows 456, 458, 460, 462 and 464, which are representative of relations corresponding to the relations 420, 422, and 424 of the production plan ontology 400. In the particular example shown, the StepStart 438, which indicates the starting point of the production process, precedes the FillStep 440, as indicated by the arrow 456. The FillStep 440 in turn precedes the CapStep 442 as represented by the arrow 458, while the CapStep 442 precedes the LabelStep 444 and immediately follows the FillStep 440, as indicated by the arrows 460 and 462, respectively. The LabelStep 444 in turn precedes the StepEnd 446 as indicated by the arrow 464, which indicates the end of the production plan represented by the FilledBottlePlan subclass instance 436.

In addition to defining the order of execution of steps of the production plan, as also shown in FIG. 4, one or more of the steps 438-446 can be associated with an operation and requested materials (none or one or more of them). For example, the FillStep 440 involves the performance of a liquid filling operation as indicated by a hasOperation relation 466 (which corresponds to the hasOperation relation 432) pointing to a Filling operation instance 448. As represented by an arrow 449, the Filling operation instance 448 is an instance of the Operation class 430 of the production plan ontology 400. The FillStep 440 additionally identifies the liquid to be filled during the filling operation represented by the instance 448 by specifying a LiquidToFill instance 450 corresponding to the Material class 414 as indicated by a requests relation 468 corresponding to the requests relation 428 of the production plan ontology 400. In the present example, information concerning certain characteristics (e.g., the type and amount) of the liquid to be filled into the bottle can be obtained by interlinking the production plan instance 406 with the order instance 306 of FIG. 3. In particular as shown, information regarding the liquid to be filled is obtained by importing information corresponding to the aParameterLiquidSpecification instance 350 of the order instance 306 as indicated by the hasParameter relation 324.

Other information is also provided in the production plan instance 406 for qualifying the CapStep 442, FillStep 440, LabelStep 446, StepStart 438, and StepEnd 446. In particular, the CapStep 442 specifies caps (e.g., bottle caps) for sealing the bottles after the filling of the liquid, by including a Cap instance 452 as indicated by a requests arrow 470. Also, the LabelStep 446 requests labels for labeling the filled bottles by including a Label instance 454 as indicated by a requests arrow 472. Further, each of the steps 438-446 is intended to operate on a bottle identified by an aBottle instance 476, as represented by respective worksOn relation arrows 477 between each of those steps and the instance 476 (which correspond to the worksOn relation 431). Although not shown, it will be understood that in some embodiments, the aBottle instance 476 can be an instance of the Bottle class 409 or alternatively, in other embodiments, the aBottle instance can be an instance of the SemiProduct class 429.

Returning to FIGS. 2A and 2B, given that a specific production plan instance such as the instance 406 has been developed/generated, a product agent such as the product agent 226 is capable of controlling the manufacture of an ordered product in the manner specified by that production plan instance. In order for the product agent 226 to perform the process specified by the production plan instance, the product agent must identify and engage workstation agents that are capable of performing one or more portions of that portion by virtue of their control over particular workstations and associated pieces of equipment and the equipment agents responsible for managing those pieces of equipment. In the present example as shown in FIG. 2B, the product agent 226 identifies appropriate workstation agents by sending one or more inquiries 288 to the services directory 286. In at least some embodiments, the inquiries 288 can be complex queries such as "Find all machines that can drill a hole of 50 mm diameter and 15 mm depth" developed by the product agent 1 226 to be addressed by the services directory 286.

The services directory 286, which is populated with information indicative of the capabilities of available workstation agents such as a first workstation agent ("WorkStation Agent1") 250 and a second workstation agent ("WorkStation Agent2") 252 as represented by arrows 282 and 284, respectively, in turn returns appropriate workstation capabilities information back to the product agent 226. The services directory 286 can perform one or more operations to determine a list of workstation agents (and associated workstations) matching the desired criteria and, for example, can employ an ontology-based service matchmaking technique in this regard. The matchmaking technique can (but does not have to) be made using automated reasoning in the ontology language. When OWL language is used, matchmaking using description logic reasoning can be used to determine whether description of the workstation capabilities matches the desired criteria for a requested service. For describing services and queries, languages such as OWL-S (OWL-Services) or Web Service Modeling Ontology (WSMO) can be used.

Upon receiving this information, the product agent 226 then sends and receives messages to the workstation agents that have been identified by the services directory 286 as potentially meeting the needs specified in the production plan instance as reflected in the inquiries 288. In the present example shown in FIG. 2B, the product agent 226 in particular is shown to send and receive messages from the first workstation agent 250 as represented by arrows 254 and 290, respectively, as well as to send and receive messages from the second workstation agent 252 as represented by arrows 256 and 257, respectively. By virtue of these communications, the product agent 226 is able to negotiate with the workstation agents 250, 252 that have been identified as being appropriate via the services directory 286, to determine the workstation(s) that are most appropriate for performing one or more various portions of the process specified in the production plan instance, as well as to plan/schedule the operations of those workstation(s) in this regard. In at least some embodiments, this negotiation involves bids being provided by the workstation agents 250, 252, where the bids include cost estimates for performing specified operations, and possibly counterbids being provided by the product agent.

Further with respect to FIG. 2B, the product agent 226 in the present example is shown to have selected the first workstation agent 250 for the purpose of performing at least a portion of the production plan instance implemented on that product agent. As illustrated, the first workstation agent 250 is responsible for a first workstation ("WorkStation1") as represented by a link 260 and is in communication with each of a first equipment agent ("Equip Agent1") 270 and a second equipment agent ("Equip Agent2") 272 as represented by arrows 278 and 280, which respectively are responsible for controlling operation of first and second pieces of equipment 262 and 264, respectively ("Equipment1" and "Equipment2", respectively), as indicated by links 274 and 276, respectively. Although not shown in detail, the first workstation agent 250 (particular when it has been selected by the product agent 226) also conducts negotiations with the equipment agents 270, 272 to determine which of those agents (and their associated pieces of equipment 262, 264) are responsible for handling one or more operations, and to plan/schedule such operations.

Although FIG. 2B only illustrates the workstation 258, pieces of equipment 262, 264 and equipment agents 270, 272 under the responsibility of the first workstation agent 250, it will be understood that the second workstation agent 252 will also be responsible for a workstation and one or more pieces of equipment and associated equipment agent(s). Further, although only the single workstation 258 with the two pieces of equipment 262, 264 operating under the control of the respective equipment agents 270, 272 are shown in FIG. 2B, in other embodiments any arbitrary number of pieces of equipment and equipment agents are possible. Indeed, any arbitrary number of workstation agents, equipment agents, workstations, and pieces of equipment are possible for identification, selection and engagement by a given product agent in its implementation of the production plan instance for which it is responsible.

As discussed above, in developing and implementing a given production plan instance, a given product agent needs to negotiate not only with the workstation agents (e.g., the workstation agents 112, 250, 252 of FIGS. 1 and 2B) but also with one or more of the transportation agents (e.g., the transportation agents 114 of FIG. 1). Negotiations with the transportation agents allow the product agent to determine how products/semi-products and/or raw materials will be transported to and from, and among, the various workstations that are involved in performing the process established by the production plan instance. In the present embodiment, some of these negotiations occur dynamically during the execution of the production plan (although in some embodiments, the negotiations can be made prior to execution of the production plan) after the product agent has obtained a generalized production plan from the database containing such production plans (e.g., the production plan databases 116 and 220 of FIGS. 1 and 2B) based upon interactions with the services directory (e.g., the services directories 120, 286) and those of the workstation agents who are identified as potential candidates for performing various operations as indicated by the services directory (e.g., the workstation agents 112, 250, 252).

Dynamic negotiations with the transportation agents (e.g., the transportation agents 114 of FIG. 1) typically takes into account the fact that one or more of the workstations can become unavailable (e.g., due to overload of work, malfunction, breakage etc) during execution of the production plan. Therefore, by virtue of dynamically planning the negotiations with the transportation agents, the production plan can be executed without obstacles under changing conditions. Generally speaking, when a certain production step from the production plan (e.g., the production plans 238 and 244 of FIG. 2A) is completed, the product agent (e.g., the product agents 226 and 230 of FIG. 2A) for that respective production plan starts planning the next step to be executed by starting negotiations with the workstation agents (e.g., the workstation agents 250 and 252 of FIG. 2B) to determine one or more workstations that can provide an operation associated with that next step, as well as negotiations with the transportation agents to deliver products/semi-products and/or raw materials from the current workstation to the next workstation. Thus, the planning by the product agents is generally one step ahead of the production plan execution.

In the present embodiment, the transportation agents (e.g., the transportation agents 114 of FIG. 1) particularly develop plan(s)/routine(s) that govern such transporting of products/semi-products and/or raw materials, again by way of an ontology-based scheme. In this regard, and referring to FIG. 5, an exemplary transportation ontology 500 as well as an exemplary instance of the transportation ontology (that is, a transportation ontology instance) 504 are shown, with the transportation ontology and transportation ontology instance being separated by a dashed line 506. The transportation ontology 500 shows an exemplary OWL-based logical representation format/ontology for a transportation layout, while the transportation ontology instance is a particular exemplary instance of that ontology. The transportation ontology instance 504 can be considered a layout of the manufacturing system (or arrangement of transportation components) that is used to develop and execute transportation of manufactured product among workstations.

Figure 5:
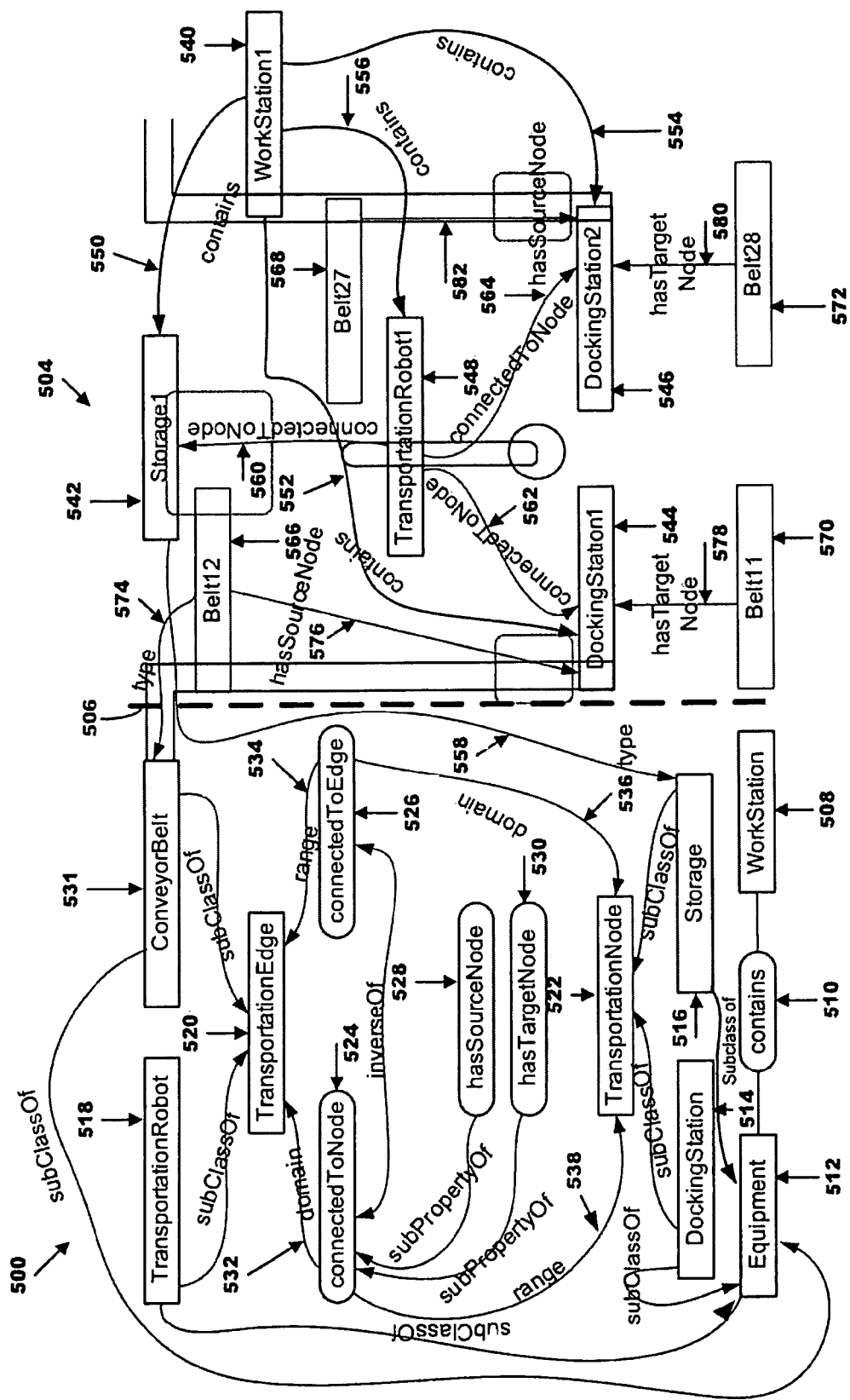
FIG. 5 a schematic representation of an exemplary transport ontology that can be employed to allow communications among various agents of the industrial control system of FIGS. 1-3, along with an exemplary transportation ontology instance formatted in accordance with such an ontology, in accordance with at least some embodiments of the present invention.

As discussed above, each workstation (e.g., the workstations 118, 258 of FIGS. 1 and 2B) is typically composed of a plurality of manufacturing resources or physical equipment. As shown in FIG. 5, such a relationship is represented in the transportation ontology 500 by a Workstation class 508 that includes an Equipment class 512 as specified by a contains relation 510. The Equipment class 512 generally represents the aggregate of all the manufacturing resources/pieces of equipment that are (or can be) present within the Workstation class 508. The Equipment class 512 in particular can include multiple instances of classes pertaining to different type of equipment. For example, as shown in FIG. 1, in one embodiment each of the workstations 118 includes one of the docking stations 124, one of the transportation robots 126, one of the conveyor belts 128, and one of the storage units 130. Each of these types of equipment can be represented in the transportation ontology 500 by a DockingStation class 514, a TransportationRobot class 518, a ConveyorBelt class 531 and a Storage class 516, each of which is a class of the Equipment class 512. It will be understood that each of the DockingStation, TransportationRobot, ConveyorBelt and Storage classes 514, 518, 531 and 516 can represent multiple docking stations, transportation robots, conveyor belts and storage units, respectively.

Additionally, each manufacturing resource/piece of equipment within a given workstation can be identified as either a transportation node at which products/semi-products and/or material can be at least temporarily held, or a transportation edge that can be utilized for transporting products/semi-products and/or material to or from the transportation node from or to another location (e.g., from or to another transportation node). For example, in the embodiment of FIG. 1, each of the docking stations 124 and the storage units 130 can be a transportation node insofar as material can be received/sent and/or stored at these manufacturing resources, while each of the transportation robots 126 and the conveyor belts 128 can be a transportation edge insofar as the conveyor belts can be utilized for transporting material and/or products/semi-products to the docking stations and/or storage units under control of the transportation robot.

As shown in FIG. 5, such a distinction between transportation edges and transportation nodes is represented in the transportation ontology 500 by way of a TransportationEdge class 520 and a TransportationNode class 522, respectively. More particularly as shown, in the present embodiment in which it is assumed that the docking stations 124 and storage units 130 are transportation nodes, the transportation ontology 500 shows the corresponding DockingStation class 514 and Storage class 516 to be subclasses of the TransportationNode class 522. Also, since in the present embodiment it is assumed that the transportation robots 126 and conveyor belts 128 are transportation edges, the transportation ontology 500 shows the corresponding TransportationRobot class 518 and ConveyorBelt class 531 to be subclasses of the TransportationEdge class 520.

Additionally, each of the TransportationEdge class 520 and the TransportationNode class 522 can further participate in a variety of relations, such as a connectedtoNode relation 524 that has a domain 532 of the TransportationEdge class and a range 538 of the TransportationNode class, and a connectedtoEdge relation 526 that has a range 534 of the TransportationEdge class and a domain 536 of the TransportationNode class. The connectedtoNode relation 524 in particular further includes a hasSourceNode subrelation 528 and a hasTargetNode subrelation 530, each of which are subproperties of the connectedtoNode relation 524. The transportation nodes can be connected to the transportation edges and/or other transportation nodes (via the transportation edges) to facilitate cooperation and define a transportation route for transporting material and/or products/semi-products therebetween. Such a connection of nodes and edges can be depicted within the transportation ontology 500 particularly by way of the connectedToEdge relation 526 and the connectedToNode relation 524 with each of the TransportationEdge and TransportationNode classes 520, 522.

Turning now to the transportation ontology instance 504, an exemplary knowledge base or instance of the exemplary transportation ontology 500 pertaining to a given workstation (e.g., one of the workstations 118, 258) is shown. In particular, the transportation ontology instance 504 includes a WorkStation1 instance 540 corresponding to the WorkStation class 508. The WorkStation1 instance 540 additionally is shown to include (contain) a Storage1 instance 542, a DockingStation1 instance 544, a DockingStation2 instance 546 and a TransportationRobot1 instance 548, as illustrated by arrows 550, 552, 554 and 556, respectively. The Storage1 instance 542 is an instance of the Storage class 516 as illustrated by an arrow 558. Additionally, although not shown in FIG. 5 (to facilitate readability), it will be understood that the DockingStation1 and DockingStation2 instances 544, 546 are each instances of the DockingStation class 514, while the TransportationRobot1 instance 548 is an instance of the TransportationRobot class 518.

Referring still to FIG. 5, the TransportationRobot1 instance 548 is connected by the connectedToNode relation 524 to each of the Storage1 instance 542, the DockingStation1 instance 544 and the DockingStation2 instance 546 as represented by arrows 560, 562 and 564, respectively. Further, the transportation ontology instance 504 also includes instances representative of a plurality of conveyor belts, namely, a Belt12 class instance 566, a Belt27 class instance 568, a Belt11 class instance 570 and a Belt28 class instance 572. Each of these instances 566, 568, 570 and 572 can be considered a respective instance of the ConveyorBelt subclass 531 (although only the Belt12 class instance in particular is shown by an arrow 574 similar representations can be made in FIG. 5 for the Belt27, Belt11 and Belt28).

The transportation instance 504 thus depicts an exemplary transportation layout as follows. The DockingStation1 instance 544 is a source node for the Belt12 instance 566 in accordance with the hasSourceNode relation 528 and additionally is a target node for the Belt11 instance 570 in accordance with the hasTargetNode relation 530, as represented by arrows 576 and 578 respectively. Relatedly, the DockingStation2 subclass instance 546 serves as a target node for the Belt28 subclass instance 572 in accordance with the hasTargetNode relation 530 and additionally is a source node to the Belt27 subclass instance 568 in accordance with the hasSourceNode relation 528, as indicated by arrows 580 and 582, respectively. Thus, by virtue of the transport instance 504, a specialized transportation layout can be defined.

By virtue of defining the transportation layout, particular transportation routes can be configured during system operation (e.g., during execution of the production plan instance) by way of the product agents (e.g., the product agents 226 and 230) obtaining a list of transportation agents from the service directory (e.g., the service directory 286). Similar to the workstation agents, the transportation agents can register their respective transport capabilities (e.g., the transport layouts) with the services directory (e.g., the services directory 286) for selection by the product agents (e.g., the product agents 226 and 230). After obtaining the list of the transportation agents, the product agents can negotiate (in the same way as with the workstation agents 250, 252) with the transportation agents to determine one or more transportation agents who can facilitate transportation of material, raw products and/or semi-products at the lowest cost from one workstation to another. In some embodiments, the transportation capabilities can be registered in the service directory directly by the workstation agent itself such that the product agents (e.g., the product agents 226 and 230) can select one or more workstations to both perform a step of the production plan instance, as well as facilitate transport of material, raw products and/or semi-products between workstations.

Returning to FIGS. 2A-2B, it should be further mentioned that the above-described processes of developing instances of the production plan is a prerequisite for executing a plan. The product agent then executes the plan to completion by selecting workstation agents (and associated equipment agents, workstations, and pieces of equipment) in accordance with the particular production plan. To transport material, products and semi-products between workstations, transportation agents are dynamically asked to develop a transportation for optimal transport between workstations based on current conditions in the system. The transportation agents are also responsible for changing the transportation plan if it becomes not executable for example because of local failure in the system. When an order has been completed, the product agent can then inform the order agent that this has occurred and the order agent can in turn similarly inform the order system of this fact. In this regard, therefore, communications from the product agents 226, 230 can be provided as indicated by the arrows 292, 296 back to order agent 222, and the order agent can in turn notify the order system 206 as represented by an arrow 294 (these arrows can also represent other communications, including communications that a requested order has not yet been completed or that there has been a failure to complete a particular order for some reason). Upon receiving a confirmation from the order agent 222 of the fulfillment of the order, the order system 206 can in turn negotiate with a supply chain management system or other delivery system regarding delivery of products to customer(s) making the order.

Advantageously, at least some embodiments of the present invention provide a highly flexible and dynamically reconfigurable manufacturing control system having (i) decentralized (e.g., distributed) control, thereby avoiding a single point of failure, (ii) explicit knowledge representation and handling, and (iii) dynamic scheduling, such that operations need not be associated with particular machines/pieces of equipment in advance, and such that a process (or any step thereof) can be easily rescheduled in the event of a failure. Further, by virtue of characterizing and defining orders in an ontology, existing production plans can be re-used for other applications or for developing new plans. By virtue of re-using existing ontologies, only the ontology instances or knowledge base need to be modified, and there is little or no need for any reprogramming of agent behavior to allow for the production of different products. Additionally, the present system provides a plug-and-play approach, where new machines can be added or existing ones removed from the system. Similarly, new agents can be added or removed and the knowledge base can be updated accordingly, without any reprogramming or system shutdown or restart being required.

Further, the present control system is able to receive updated ontologies and updated ontology instances without requiring reprogramming of the existing agents, thereby avoiding the need to shutdown and/or restart the system. In addition, the control system is able to perform at least some of its operations, such as, workstation selection or other service matchmaking operations (including manufacturing, industrial or transportation services) using automated reasoning based on underlying ontology.

Notwithstanding the embodiments described above with respect to FIGS. 1-5, various refinements and/or additions to the features above are encompassed within the scope of the present invention. For example, the industrial control system 100 can include other conventional systems including various input, output devices and/or software components. Further, the interactions, specifications and number of each of the agents can vary. Additionally, notwithstanding the ontologies described above, it will be noted that such ontologies are merely exemplary. Numerous variations to each of those ontologies are contemplated and considered within the scope of the present invention. Although the embodiments described above envision the use of multiple ontologies (e.g., the order ontology, production plan ontology, and transportation ontology), in other embodiments only one overarching ontology can be employed that includes aspects of each of these multiple ontologies. Indeed, in still additional embodiments one or more ontologies having any of a variety of aspects that are identical or similar to, or different from, the ontologies described above can be employed. Further, despite any method(s) being outlined in a step-by-step sequence, the completion of acts or steps in a particular chronological order is not mandatory. Further, modification, rearrangement, combination, reordering, or the like, of acts or steps is contemplated and considered within the scope of the description and claims.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of controlling an industrial process comprising:
   receiving an order;
   processing the order so as to generate an order instance representative of the received order in accordance with an order ontology;
   generating a production plan instance in accordance with a production plan ontology, the production plan instance being developed at least in part by a first agent in response to receiving at least one portion of the order instance, the production plan instance being representative of a plan for operating the industrial process in a manner so as to satisfy at least one portion of the received order; and
   controlling the industrial process based at least indirectly upon the production plan instance.

2. The method of claim 1, wherein the order is received by an order system, which processes the order to generate the order instance.

3. The method of claim 1, wherein the order instance is provided to an order agent, wherein the order instance includes at least one product order instance, and wherein the order agent transmits the product order instance to the first agent, which is a product agent.

4. The method of claim 1, wherein the first agent is a product agent, and wherein the product agent communicates with a first database in order to obtain at least one possible generalized production plan based upon which the production plan instance can be developed or to obtain the production plan instance from the database.

5. The method of claim 1, wherein the first agent communicates with a services database to identify at least one additional agent that is capable of performing at least one portion of the plan represented by the production plan instance.

6. The method of claim 5, wherein the first agent additionally communicates with the at least one additional agent to determine whether the at least one additional agent should perform the at least one portion of the plan represented by the production plan instance.

7. The method of claim 6, wherein the first agent negotiates with the at least one additional agent in order to determine whether the at least one additional agent should perform the at least one portion of the plan, and wherein the negotiating is based upon at least one bid received from the at least one additional agent.

8. The method of claim 6 wherein, upon the first agent making a determination that the at least one additional agent should perform the at least one portion of the plan, the first agent causes the at least one additional agent to operate so as to result in performing of the at least one portion of the plan and thereby control the industrial process.

9. The method of claim 6, wherein the at least one additional agent is a workstation agent responsible for a workstation.

10. The method of claim 9, wherein the workstation includes a plurality of equipment portions, wherein a plurality of equipment agents are respectively responsible for the plurality of equipment portions, respectively, and wherein the workstation agent is in communication with the plurality of equipment agents.

11. The method of claim 10, wherein the workstation agent negotiates with the equipment agents so as to assign responsibilities to the equipment agents in terms of performing tasks in accordance with the at least one portion of the plan.

12. The method of claim 10, wherein the first agent also communicates with at least one further agent to determine how at least one of an amount of material, a finished product and a semi-product is transported to or from at least one of the workstation and the plurality of equipment portions.

13. A method of controlling an industrial process so as to produce a product in response to an order, the method comprising:
   receiving the order from an external source;
   processing the order at an order system so as to generate an order instance representative of the received order in accordance with an order ontology;
   identifying a plurality of product order instances based upon the order instance;
   sending the plurality of product order instances respectively to a plurality of product agents, respectively;
   conducting communications between the plurality of product agents and at least one database so as to identify a plurality of generalized production plans capable of serving as bases for developing a plurality of production plan instances for at least indirectly governing a plurality of aspects of the industrial process in a manner so as to satisfy respective product orders associated with the plurality of product order instances, respectively;

conducting additional communications between the plurality of product agents and a plurality of additional agents, wherein the plurality of product agents based upon the additional communications and the plurality of generalized production plans develop the plurality of production plan instances; and controlling the aspects of the industrial process based at least indirectly upon the production plan instances.

14. The method of claim 13, wherein the aspects of the industrial process are controlled by the plurality of additional agents based upon the plurality of production plan instances, the additional agents exercising control over pieces of equipment either directly or indirectly via equipment agents.

15. The method of claim 14, wherein the additional communications concern negotiations between the product agents and the additional agents, and further comprising sending inquiries from the plurality of product agents to at least one additional database to identify ones of the additional agents that are capable of governing at least some of the aspects of the industrial process.

16. The method of claim 15, wherein the negotiations are done using an automated reasoning based upon the plurality of production plan instances.

17. An industrial control system comprising:

an order system configured to receive an order from an external source and process the order to generate an order instance in accordance with an order ontology;

at least one database storing a plurality of selectable generalized production plans and information identifying capabilities of a plurality of control entities; and a product agent in at least indirect communication with the order system, the at least one database and the control entities, wherein the product agent receives at least one portion of the order instance, selects at least one of the generalized production plans, and communicates with the control entities so as to determine a production plan instance suitable for governing at least one aspect of an industrial process in order to satisfy at least one portion of the received order corresponding to the at least one portion of the order instance.

18. The industrial control system of claim 17, wherein the plurality of control entities includes a plurality of workstation agents that are respectively capable of controlling operations of a plurality of workstations, respectively.

19. The industrial control system of claim 17, further comprising a plurality of transportation agents, wherein the product agent is additionally in communication with the transportation agents, and wherein the plurality of transportation agents develop and maintain a transportation ontology instance in accordance with a transportation ontology that governs how at least one of an amount of material, a finished product, and a semi-product is transported to or from at least one piece of equipment governed at least indirectly by at least one of the control entities.

20. The industrial control system of claim 19, wherein each of the order ontology, a production plan ontology and the transportation ontology is a Web Ontology Language (OWL) based logical representation format, and wherein each of the order instance, the production plan instance and the transportation ontology instance is a respective data structure including order information, production plan information, and transportation information, respectively, that is organized in a respective manner corresponding to the order ontology, the production plan ontology, and the transportation ontology, respectively.

21. The industrial control system of claim 20, wherein updates for each of the order ontology, the production plan ontology, the transportation ontology, the order instance, the production plan instance and the transportation ontology instance can be received in a manner that does not require reprogramming of the product agent or any other product agent, transportation agent, order agent or other agents.

22. The industrial control system of claim 20, wherein updates for each of the order ontology, the production plan ontology, the transportation ontology, the order instance, the production plan instance and the transportation ontology instance can be received and processed without shutting down or restarting the industrial control system.

23. The industrial control system of claim 17, further comprising an order agent to which is provided the order instance and a plurality of additional product agents, wherein the order agent provides respective portions of the order instance relating to orders for a plurality of different products, respectively, to the respective product agents.

24. The industrial control system of claim 17, wherein the product agent is formed via software implemented on means for processing.

25. The industrial control system of claim 17, wherein the at least one database includes a first database storing the selectable generalized production plans and a second database storing the information identifying the capabilities of the plurality of control entities.

26. A method of controlling an industrial process comprising:

receiving an order;

processing the order so as the generate an order instance representative of the received order in accordance with an order ontology;

generating a production plan instance in response to receiving at least one portion of the order instance, the production plan instance being developed at least in part by a first agent, the production plan instance being representative of a plan for operating the industrial process in a manner so as to satisfy at least one portion of the received order; and controlling the industrial process based at least indirectly upon the production plan instance.

27. The industrial control system of claim 26, wherein the production plan instance is in accordance with a production plan ontology, and wherein each of the order ontology and the production plan ontology is a Web Ontology Language (OWL) based logical representation format, wherein the order instance is a first data structure that is organized in a manner corresponding to the order ontology, and the production plan instance is a second data structure that is organized in a manner corresponding to the production plan ontology.

28. The industrial control system of claim 26, wherein the first agent communicates with the at least one additional agent to determine whether the at least one additional agent should perform the at least one portion of the plan represented by the production plan instance.

* * * * *